M. C. JUDSON.
MACHINE FOR MAKING CHAIN AND FABRIC.
APPLICATION FILED APR. 30, 1917.

1,371,688.

Patented Mar. 15, 1921.

M. C. JUDSON.
MACHINE FOR MAKING CHAIN AND FABRIC.
APPLICATION FILED APR. 30, 1917.

1,371,688.

Patented Mar. 15, 1921.

Witnesses:
Robert H. Frier
Arthur W. Carbry

Inventor:
Madison C. Judson
Offield Towle Graves & Offield
Attys.

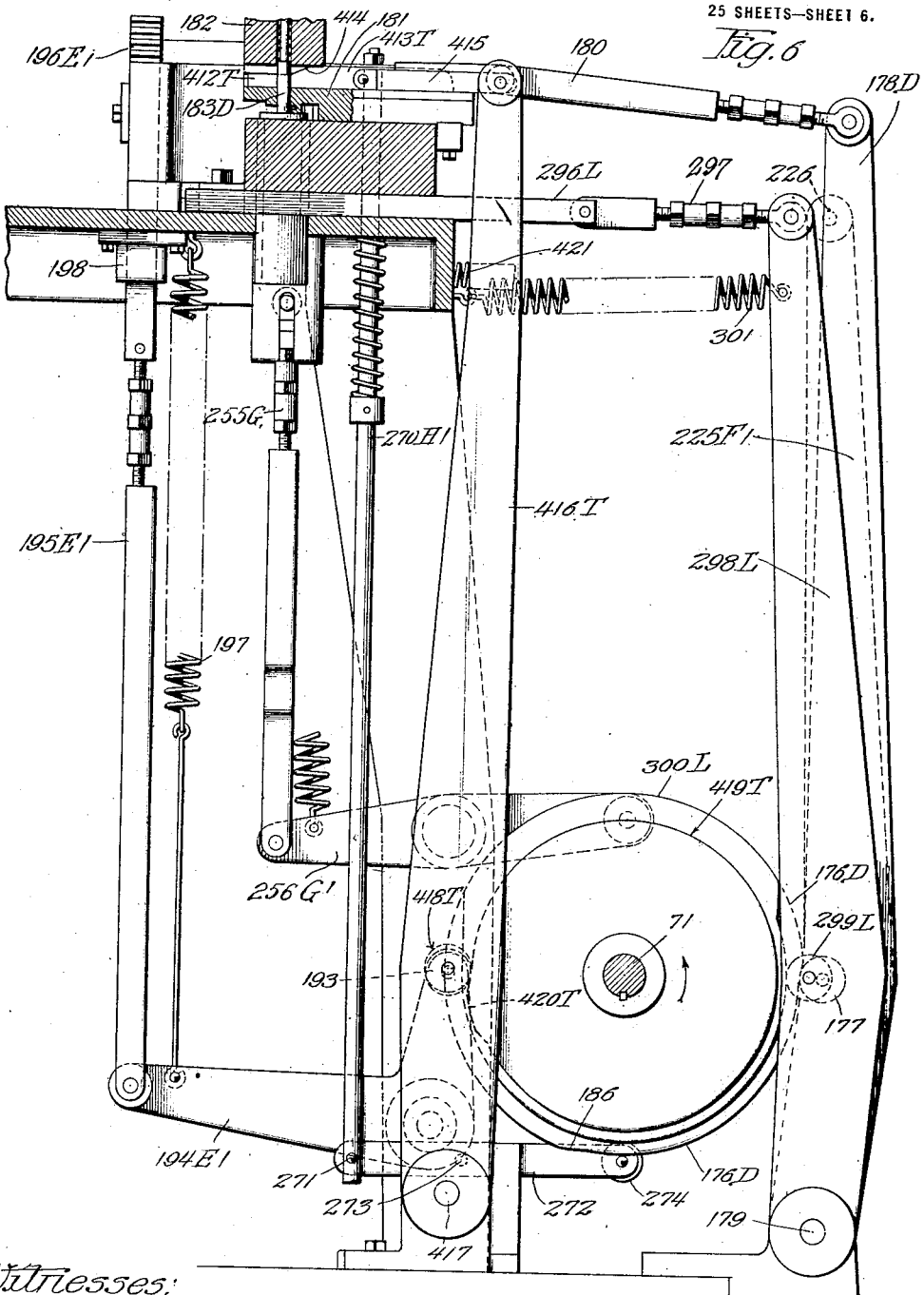

M. C. JUDSON.
MACHINE FOR MAKING CHAIN AND FABRIC.
APPLICATION FILED APR. 30, 1917.
1,371,688. Patented Mar. 15, 1921.
25 SHEETS—SHEET 7.
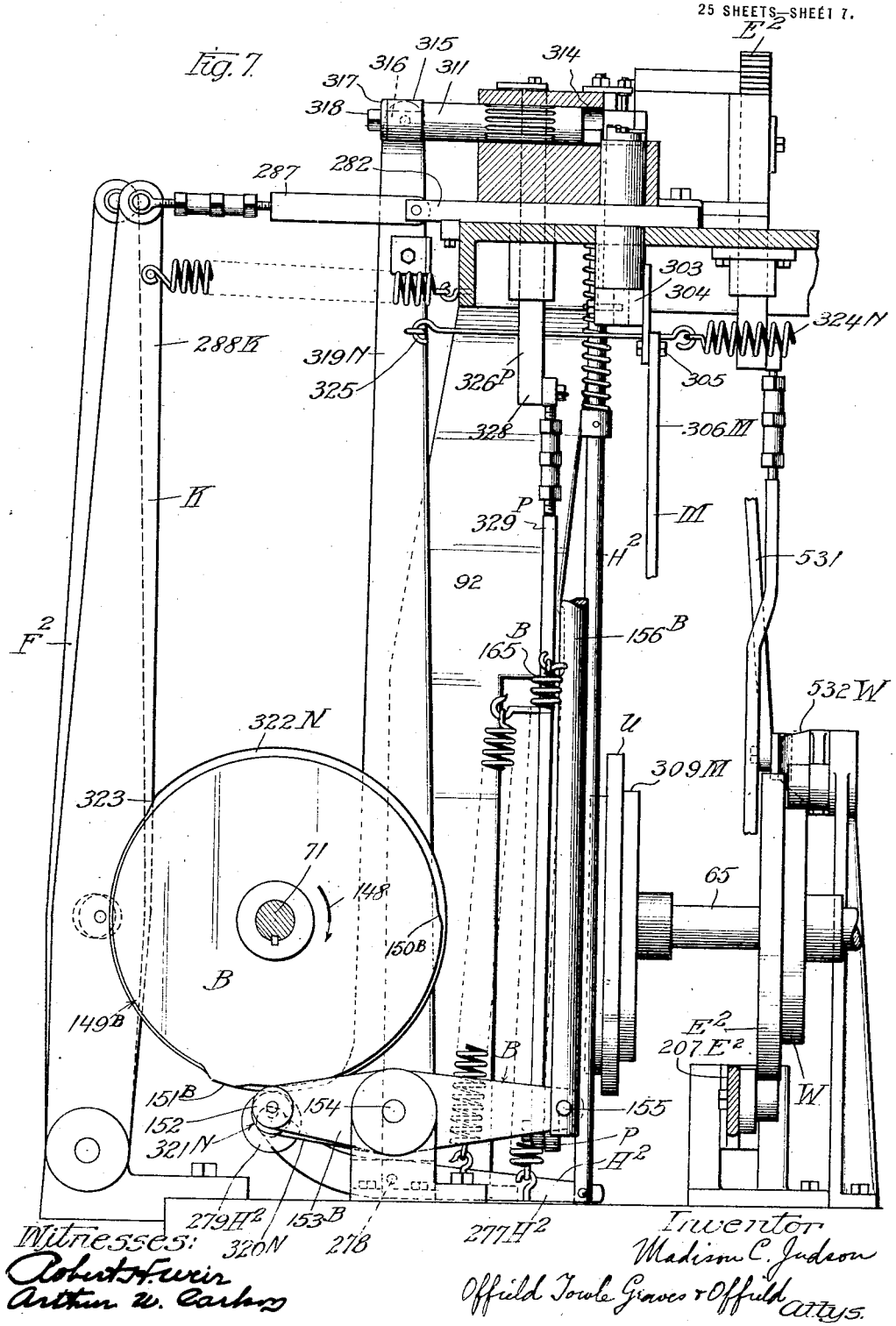

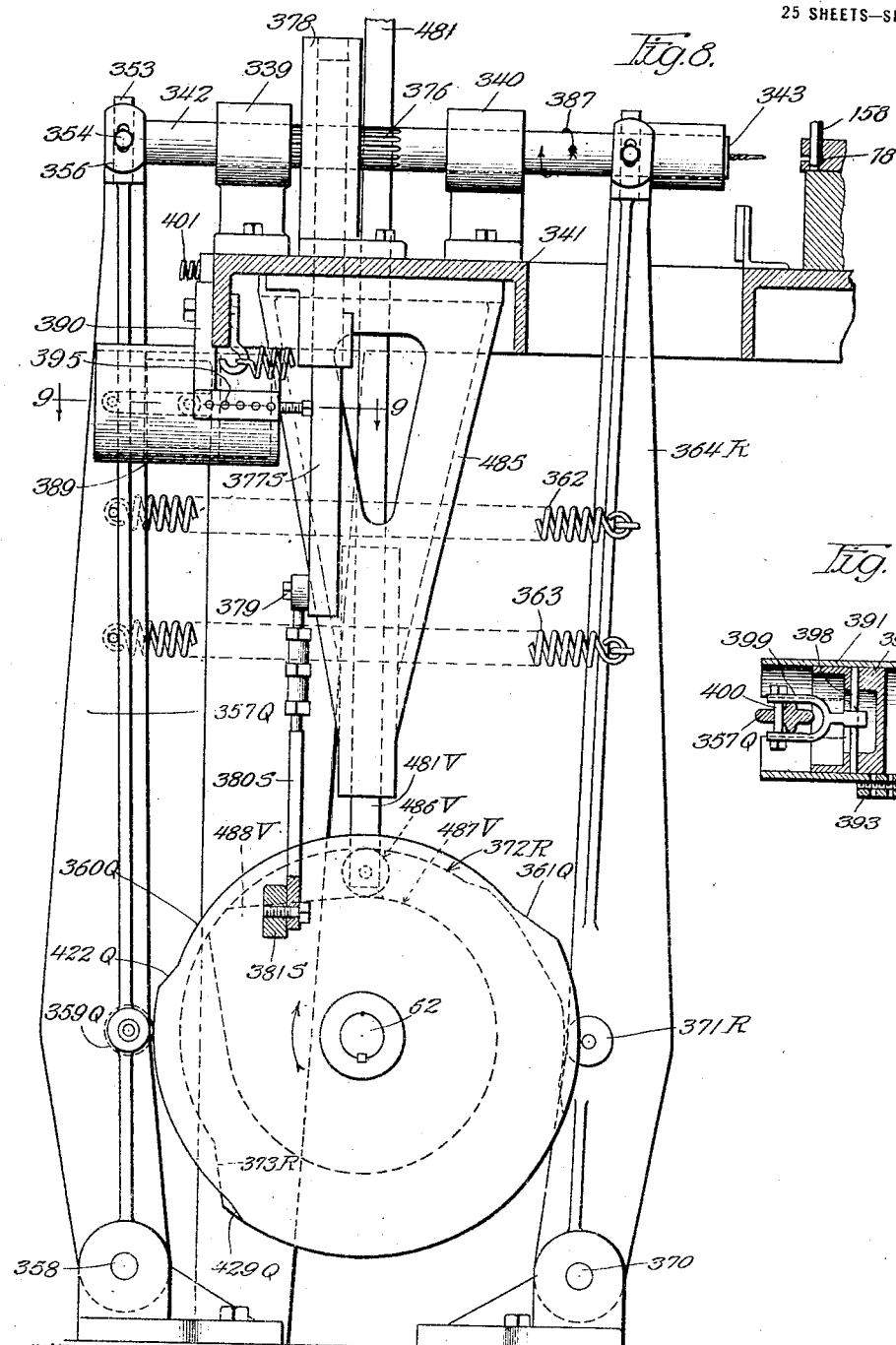

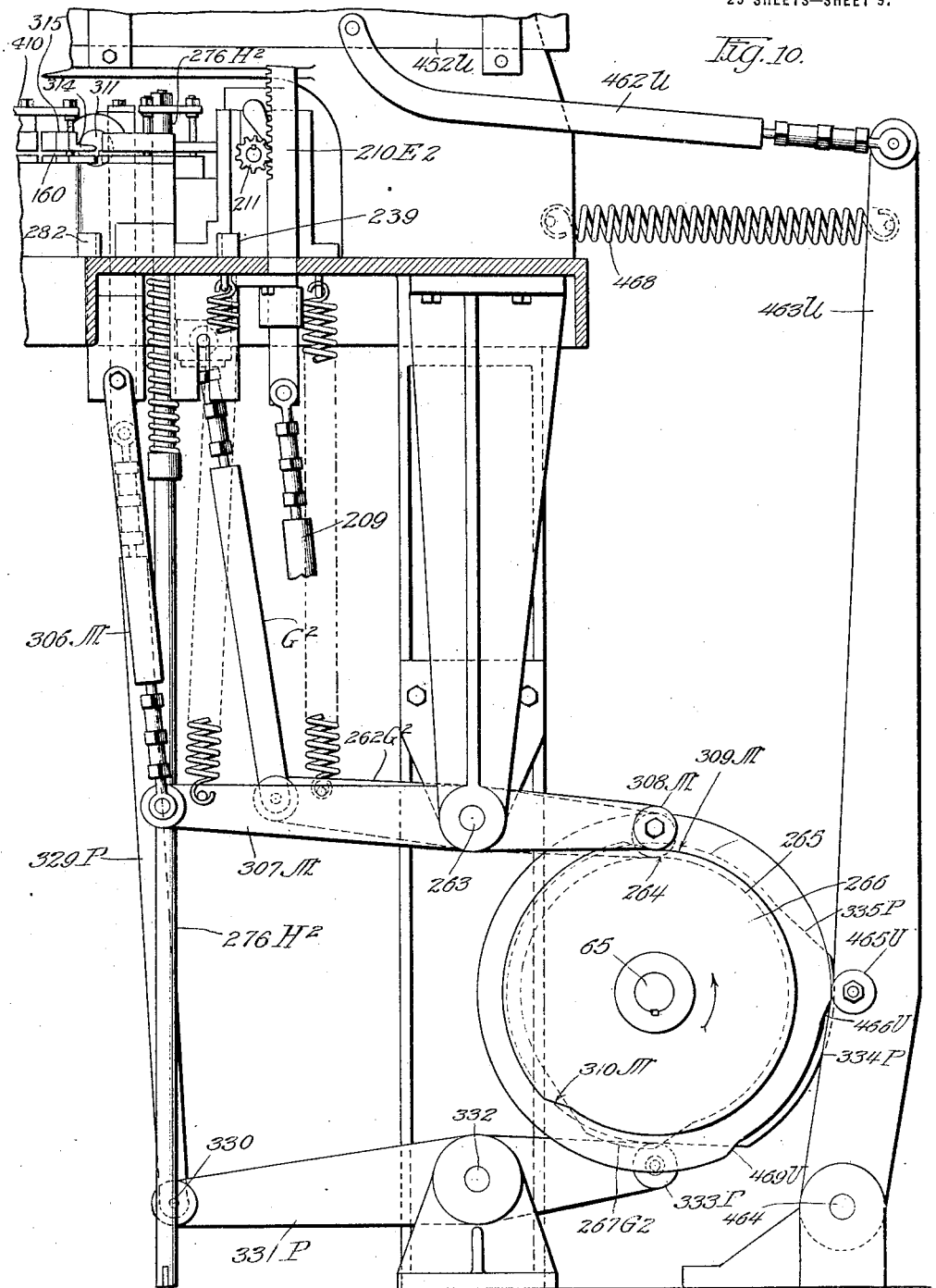

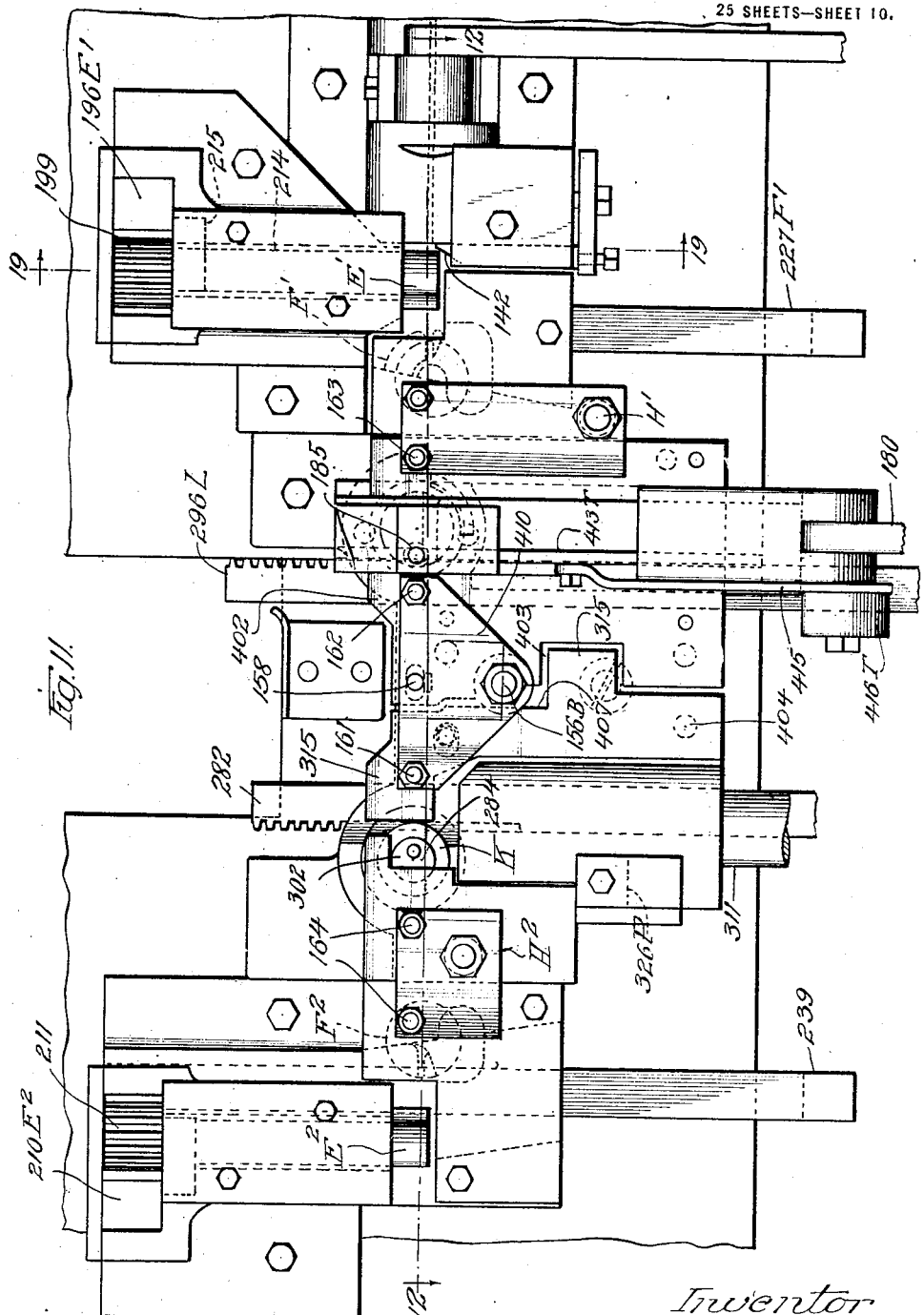

M. C. JUDSON.
MACHINE FOR MAKING CHAIN AND FABRIC.
APPLICATION FILED APR. 30, 1917.
1,371,688.
Patented Mar. 15, 1921.
25 SHEETS—SHEET 11.
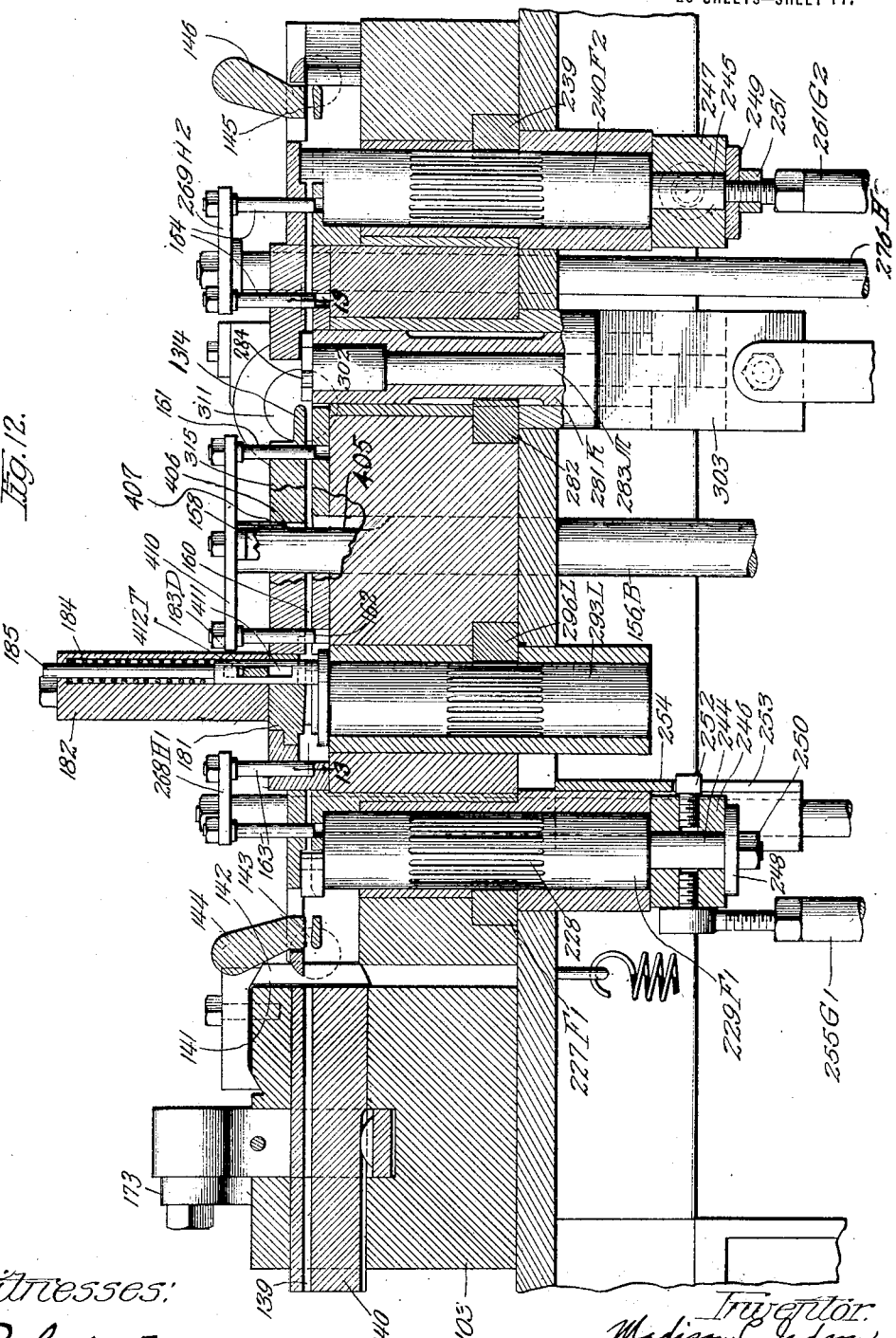

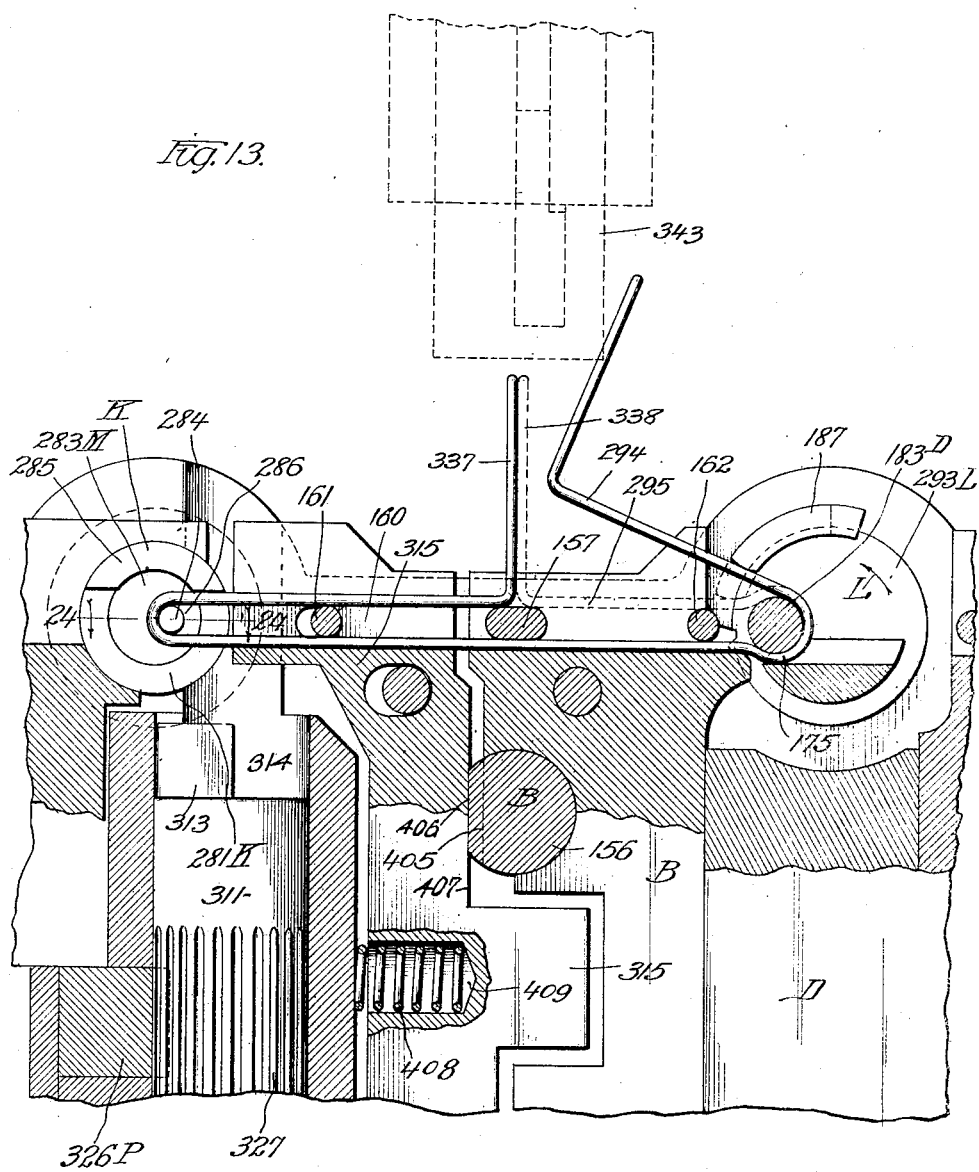

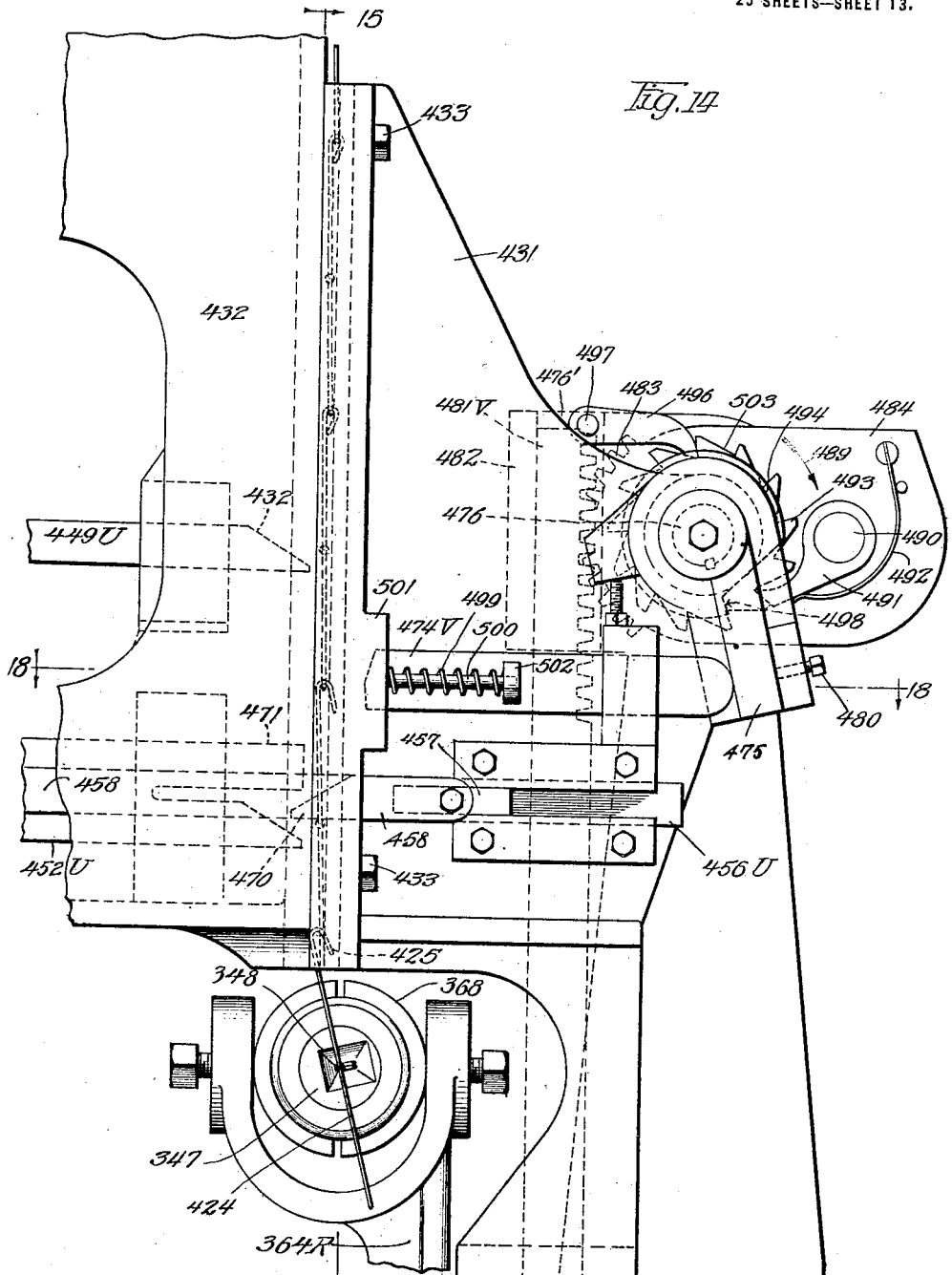

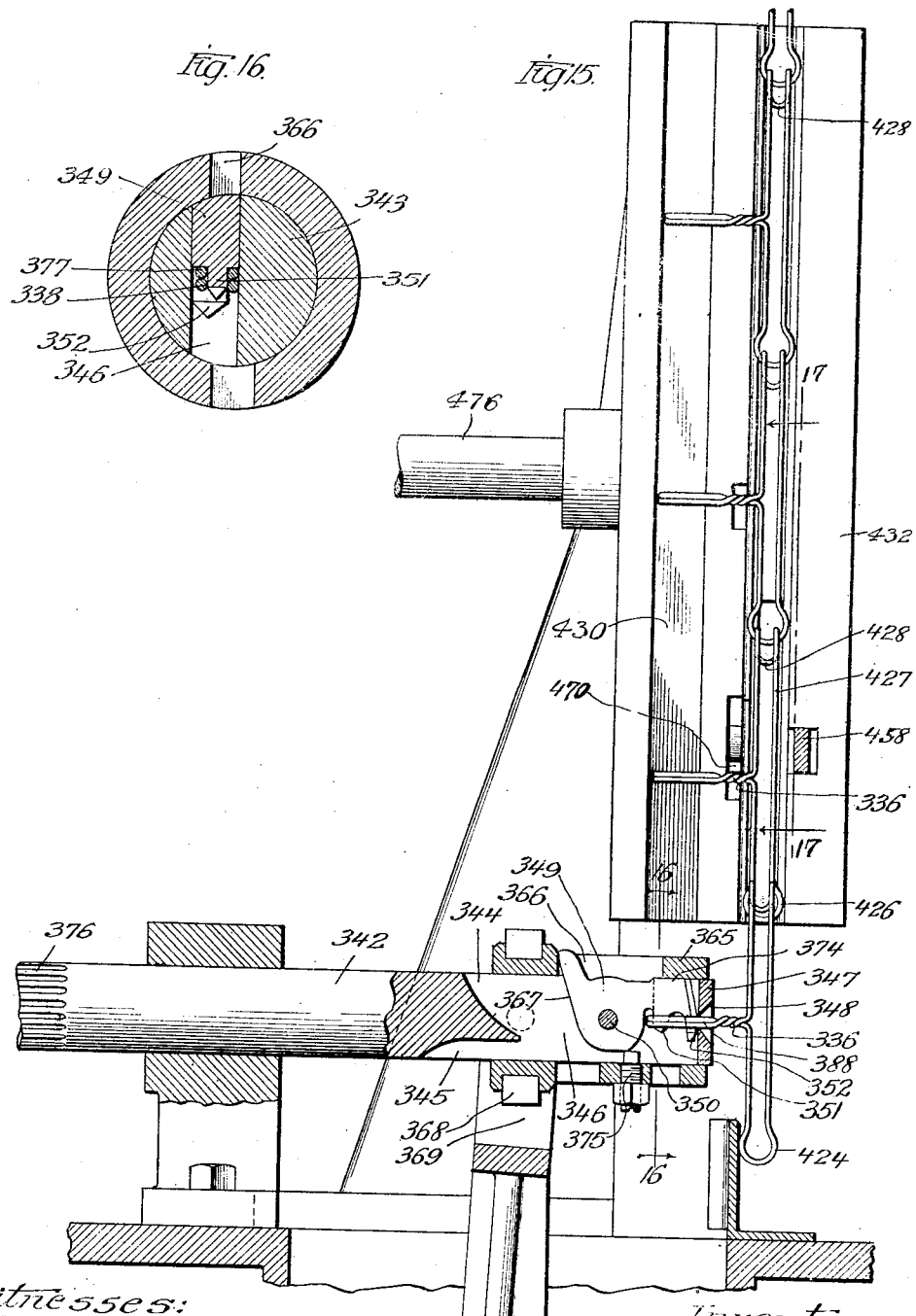

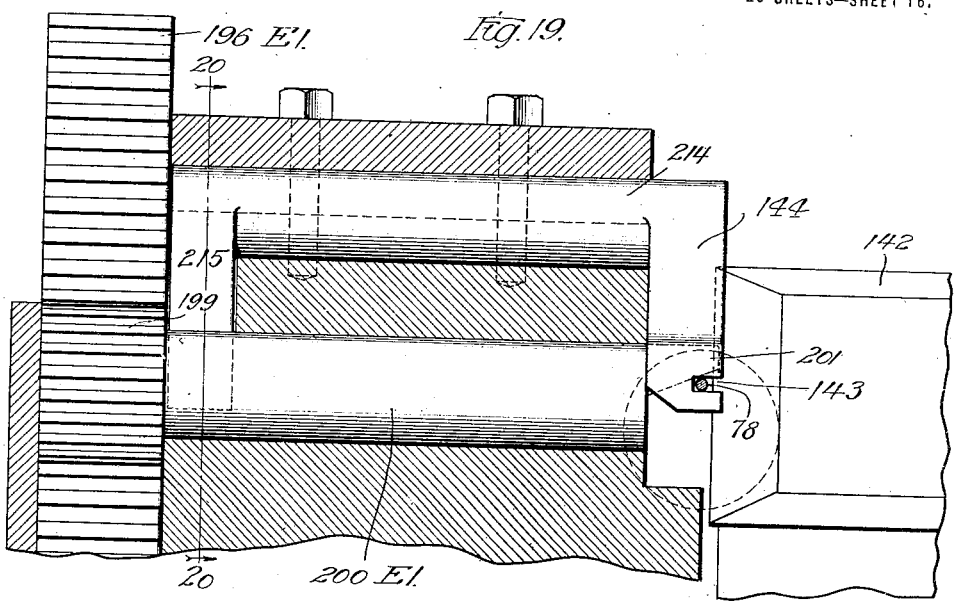
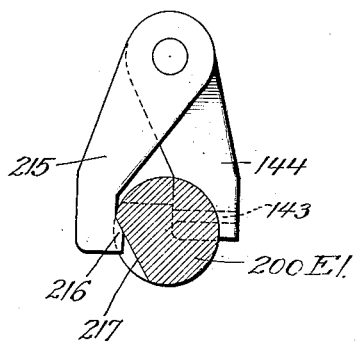
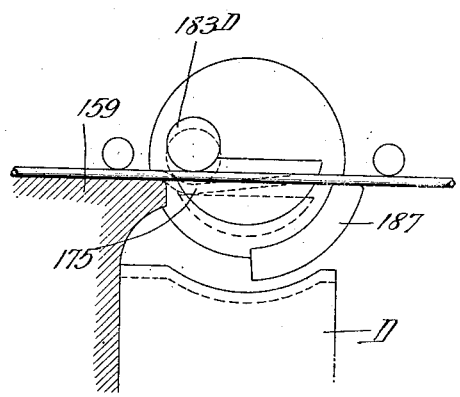

M. C. JUDSON.
MACHINE FOR MAKING CHAIN AND FABRIC.
APPLICATION FILED APR. 30, 1917.

1,371,688.

Patented Mar. 15, 1921.

Witnesses:
Robert H. Weir
Arthur W. Parker

Inventor
Madison C. Judson
Offield Towle Graves & Offield
Attys.

M. C. JUDSON.
MACHINE FOR MAKING CHAIN AND FABRIC.
APPLICATION FILED APR. 30, 1917.

1,371,688.

Patented Mar. 15, 1921.
25 SHEETS—SHEET 18.

Witnesses:

Inventor:
Madison C. Judson
Offield Towle Graves & Offield
Attys.

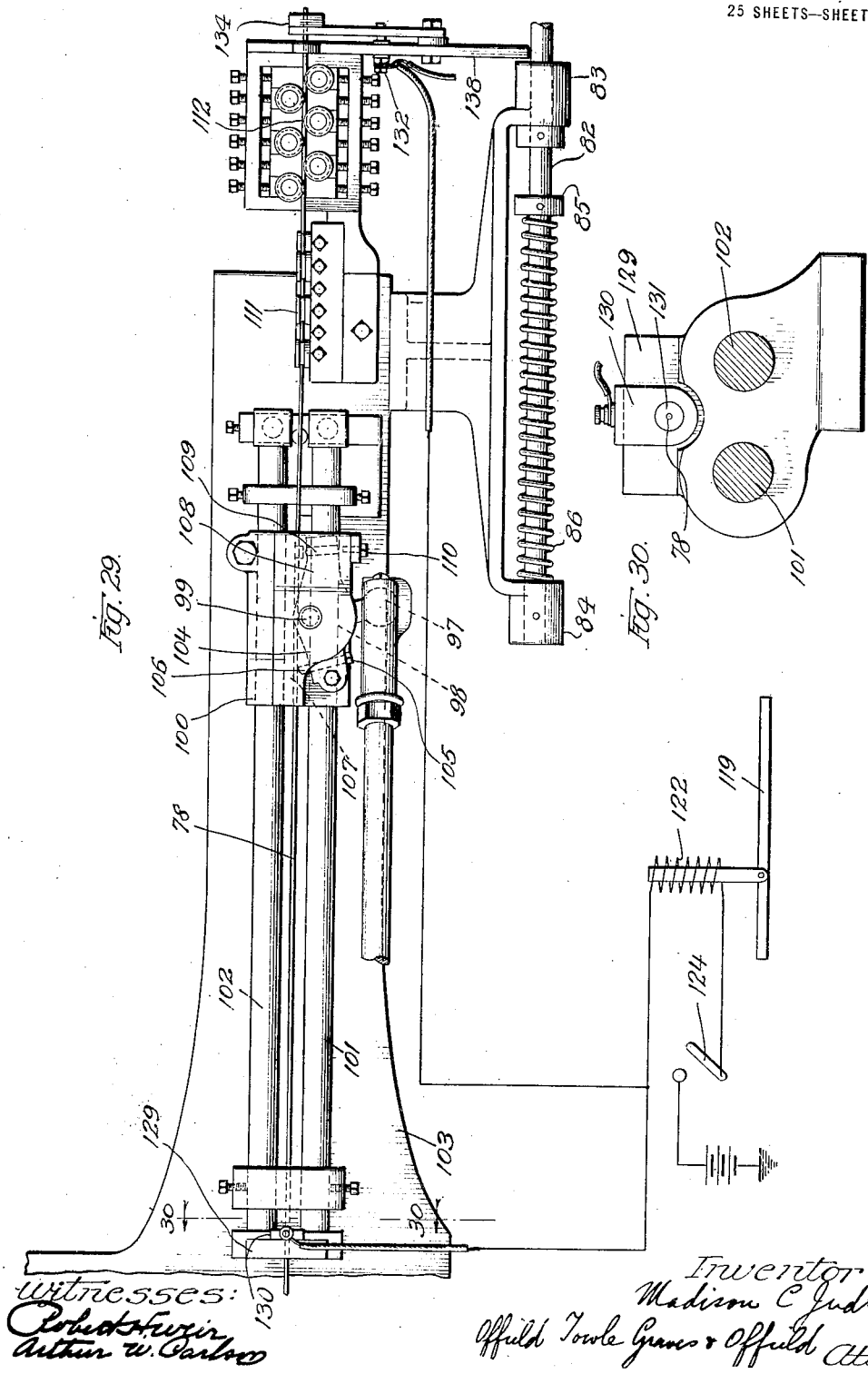

M. C. JUDSON.
MACHINE FOR MAKING CHAIN AND FABRIC.
APPLICATION FILED APR. 30, 1917.

1,371,688.

Patented Mar. 15, 1921.
25 SHEETS—SHEET 20.

M. C. JUDSON.
MACHINE FOR MAKING CHAIN AND FABRIC.
APPLICATION FILED APR. 30, 1917.

1,371,688.

Patented Mar. 15, 1921.
25 SHEETS—SHEET 21.

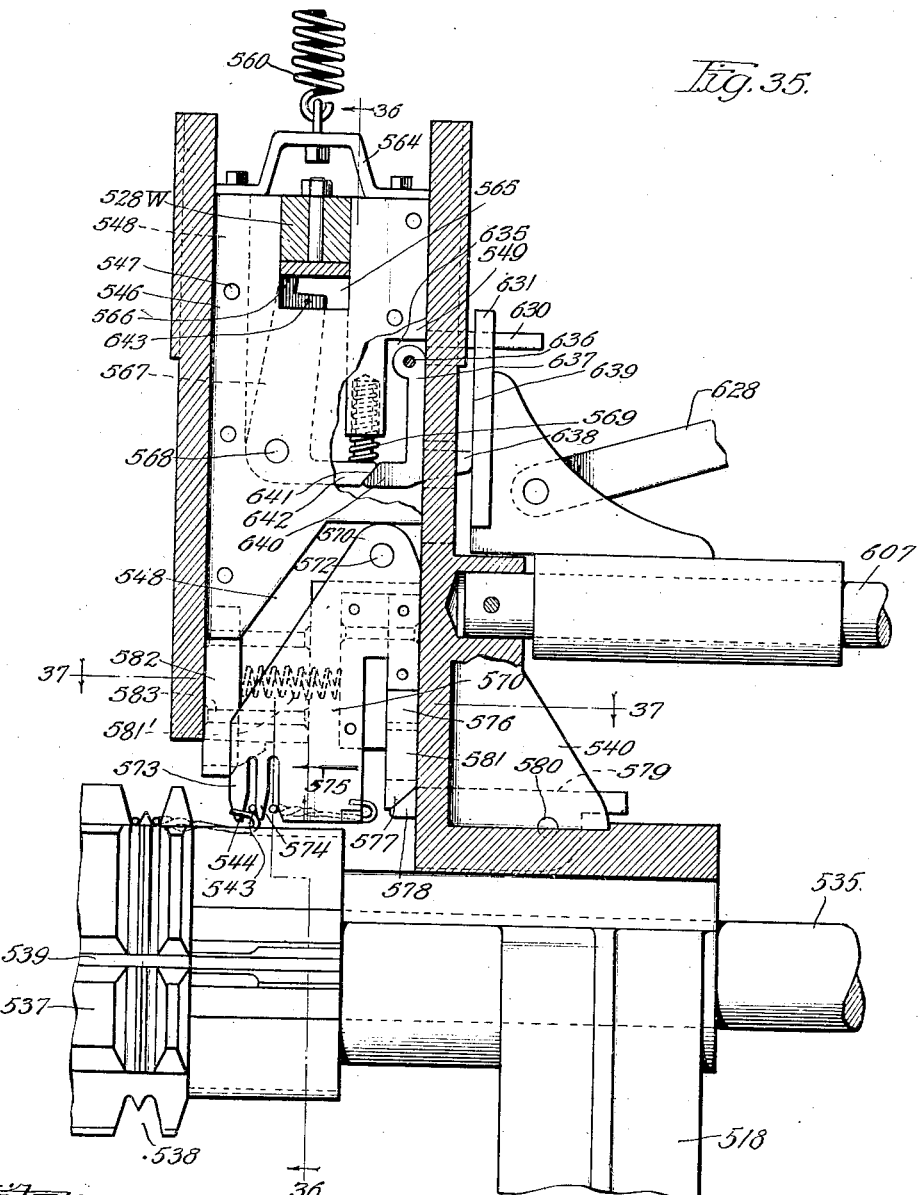

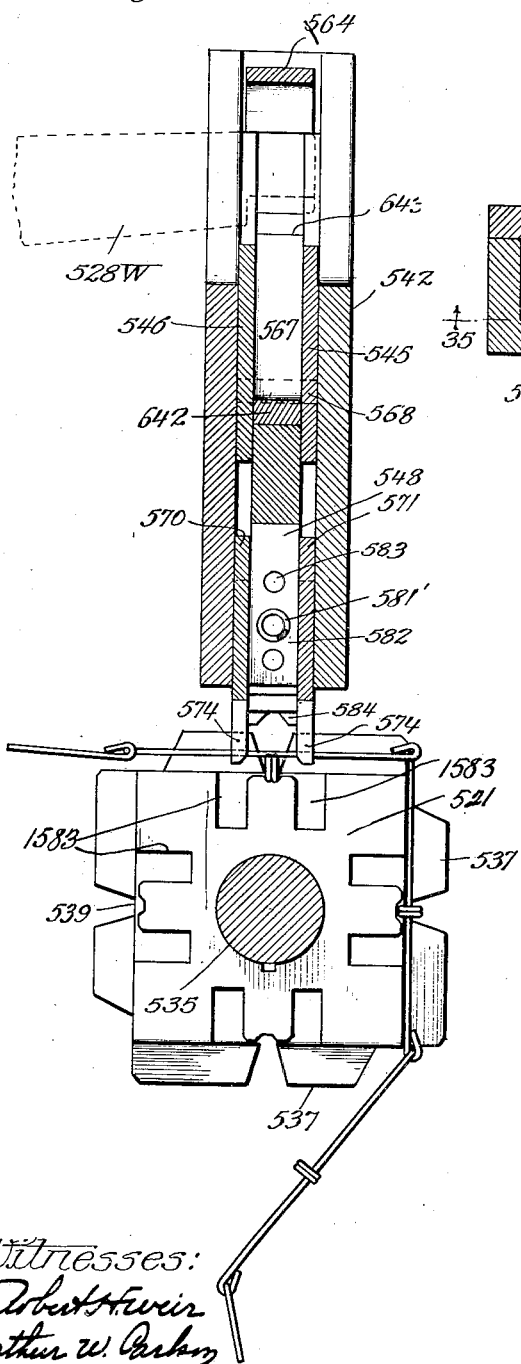
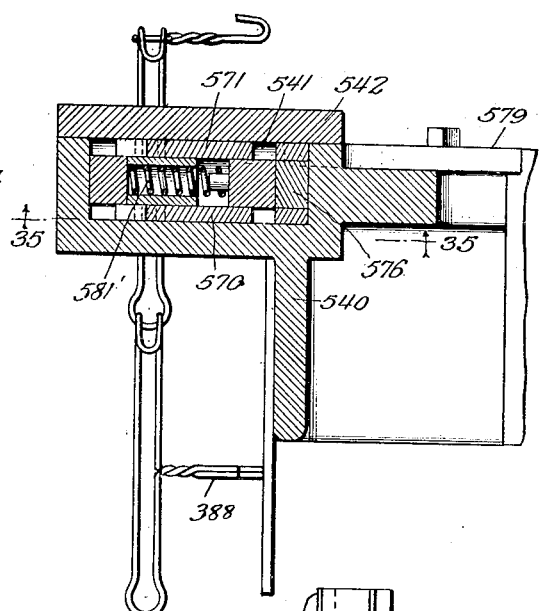
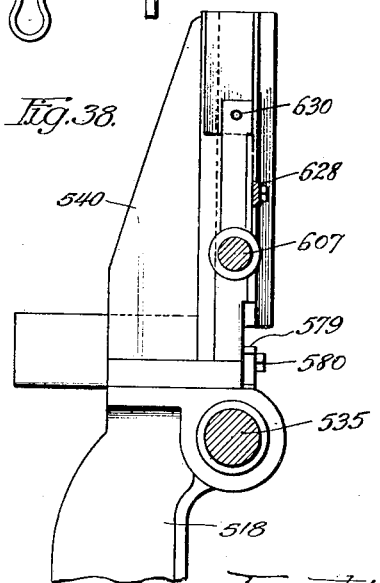

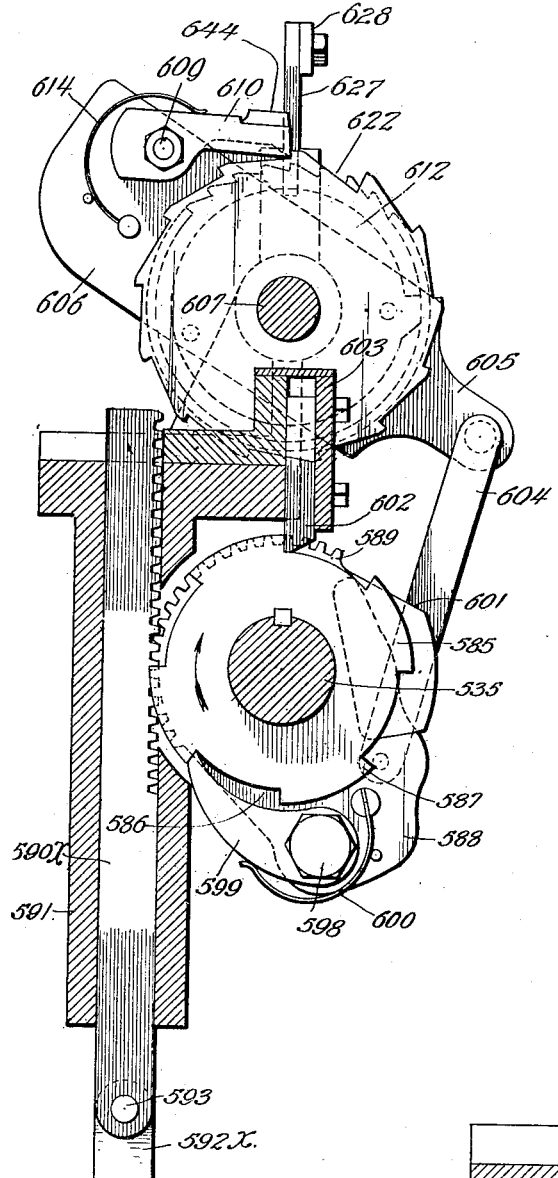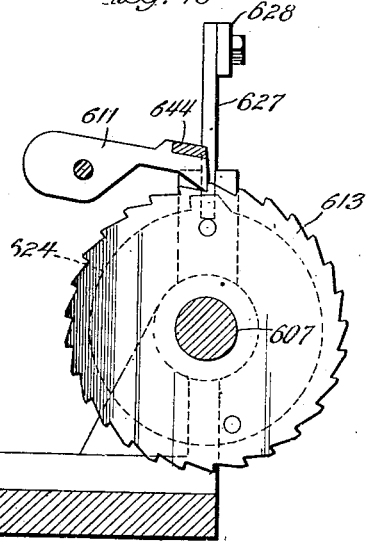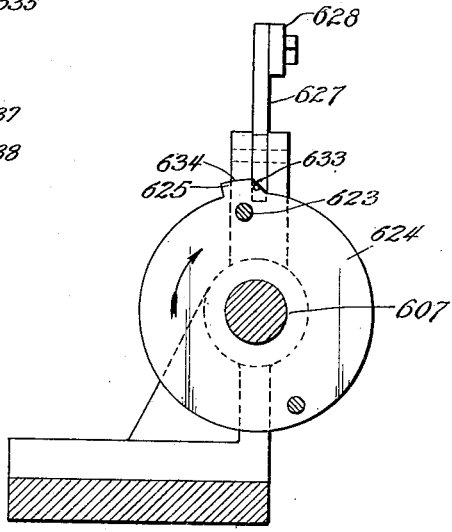

M. C. JUDSON.
MACHINE FOR MAKING CHAIN AND FABRIC.
APPLICATION FILED APR. 30, 1917.
1,371,688.
Patented Mar. 15, 1921.
25 SHEETS—SHEET 25.
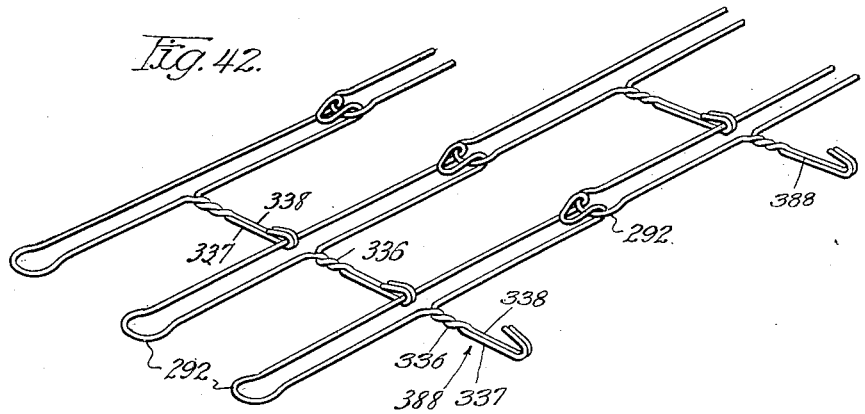
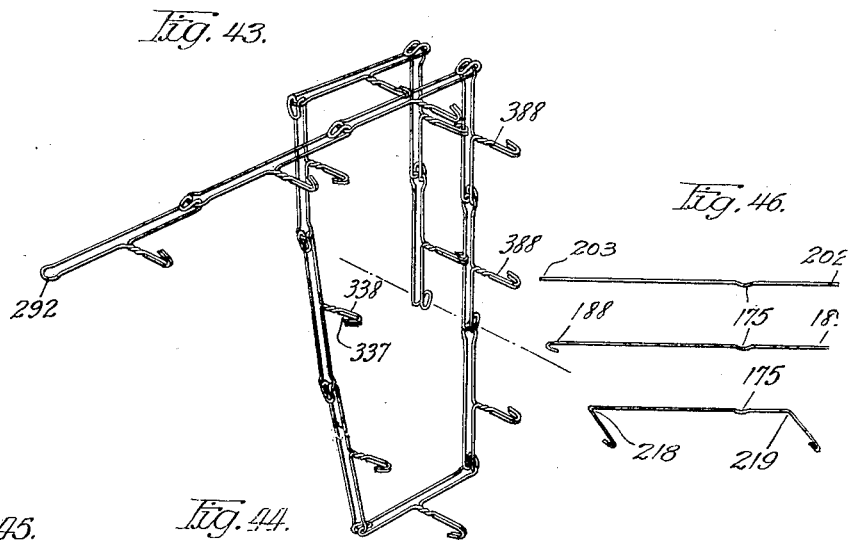
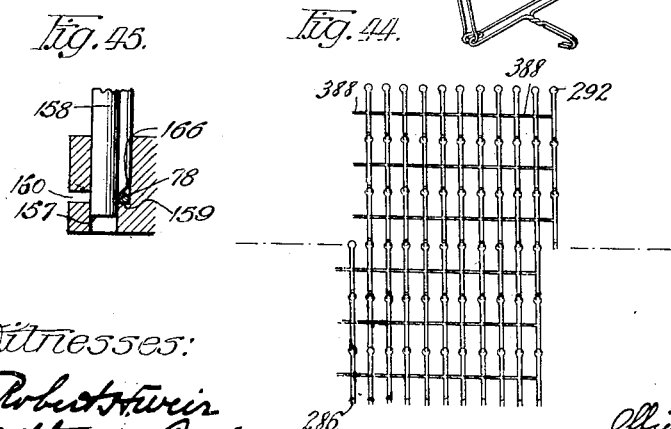
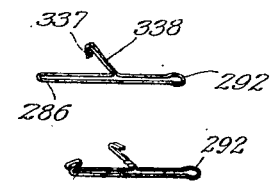
Witnesses:
Robert Weir
Arthur W. Carlson
Inventor
Madison C. Judson
Offield Towle
Graves & Offield Attys.

UNITED STATES PATENT OFFICE.

MADISON C. JUDSON, OF OSHKOSH, WISCONSIN, ASSIGNOR TO SIMMONS COMPANY, OF KENOSHA, WISCONSIN, A CORPORATION OF DELAWARE.

MACHINE FOR MAKING CHAIN AND FABRIC.

1,371,688.  Specification of Letters Patent.  Patented Mar. 15, 1921.

Application filed April 30, 1917. Serial No. 165,538.

*To all whom it may concern:*

Be it known that I, MADISON C. JUDSON, a citizen of the United States, residing at Oshkosh, in the county of Winnebago and State of Wisconsin, have invented certain new and useful Improvements in Machines for Making Chain and Fabric, of which the following is a specification.

My invention relates to machines for making chains and fabrics, and is particularly adapted for use in connection with apparatus for constructing wire link chains and subsequently forming or assembling such link chains into fabric form.

In its preferred application, the invention contemplates the forming of wire link units from individual lengths of wire severed from the end of a continuous wire supply. Said links, after having been formed, are interhooked together to form a continuous chain, and subsequently a wire link fabric is constructed from the said chain by advancing the same helically along the edge of a helical-shaped tube of previously formed fabric, while at the same time automatically effecting transverse connections between the adjacent chain spirals.

In its preferred application, the invention also is particularly well adapted for use in connection with the manufacture of chain or fabric of certain special types; for instance, I shall hereinafter describe a machine which is particularly designed for making chain and fabric, such as is disclosed in United States patent to Samuel Bronstien, No. 1,101,005, issued June 23, 1914.

In view of the foregoing, it will be understood that the primary object of the invention is to provide improved apparatus for constructing link chain and wire fabric. Other objects of the invention are,—to provide a machine for making wire links embodying a longitudinal member and an integrally formed transverse member; to provide a machine capable of assembling such last described links into a continuous chain; to provide a machine for constructing wire link fabric from such chain; to provide a combined machine which will carry out rapidly, efficiently, and economically all of the above named objects; to provide a machine which shall be simple and economical to manufacture, while being efficient, practical, and inexpensive to maintain and operate; and, in general, to provide an improved machine of the character referred to.

In the drawings, which illustrate the application of my invention to a combined machine for constructing and assembling wire links, chain, and fabric, such as is described in the Bronstien patent above referred to—

Fig. 5 is a sectional plan view of the machine taken on the line 5—5 of Fig. 1;

Fig. 6 is a section taken on the line 6—6 of Fig. 1;

Fig. 7 is a section taken on the line 7—7 of Fig. 1;

Fig. 8 is a section taken on the line 8—8 of Fig. 2;

Fig. 9 is a section taken on the line 9—9 of Fig. 8;

Fig. 10 is a section taken on the line 10—10 of Fig. 3;

Fig. 11 is a plan view, looking down, as in Fig. 5, but showing, greatly enlarged, the main mechanisms for forming the wire links;

Fig. 12 is a vertical section taken on the line 12—12 of Fig. 11;

Fig. 13 is a sectional plan view taken on the line 13—13 of Fig. 12;

Fig. 14 is a fragmentary enlargement of a portion of Fig. 1, showing the chain-feeding mechanism;

Fig. 15 is a section taken on the line 15—15 of Fig. 14;

Fig. 16 is a section taken on the line 16—16 of Fig. 15;

Fig. 19 is a vertical section taken on the line 19—19 of Fig. 11;

Fig. 20 is a section taken on the line 20—20 of Fig. 19;

Fig. 21 is a fragmentary plan view of parts shown at the right hand side of Fig. 13;

Figure 1:
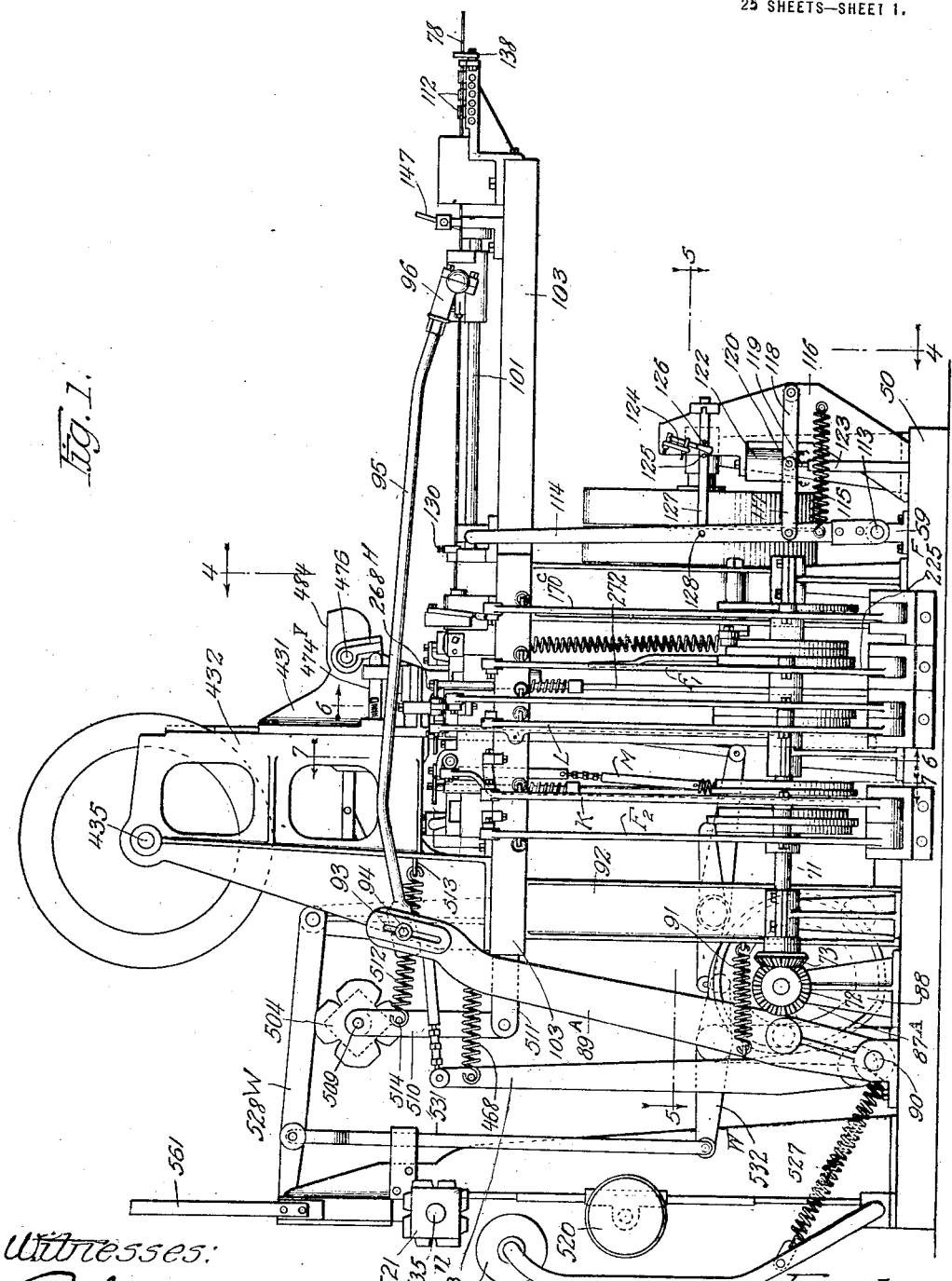
Figure 1 is a front side elevation of the combined machine.
Figure 3:
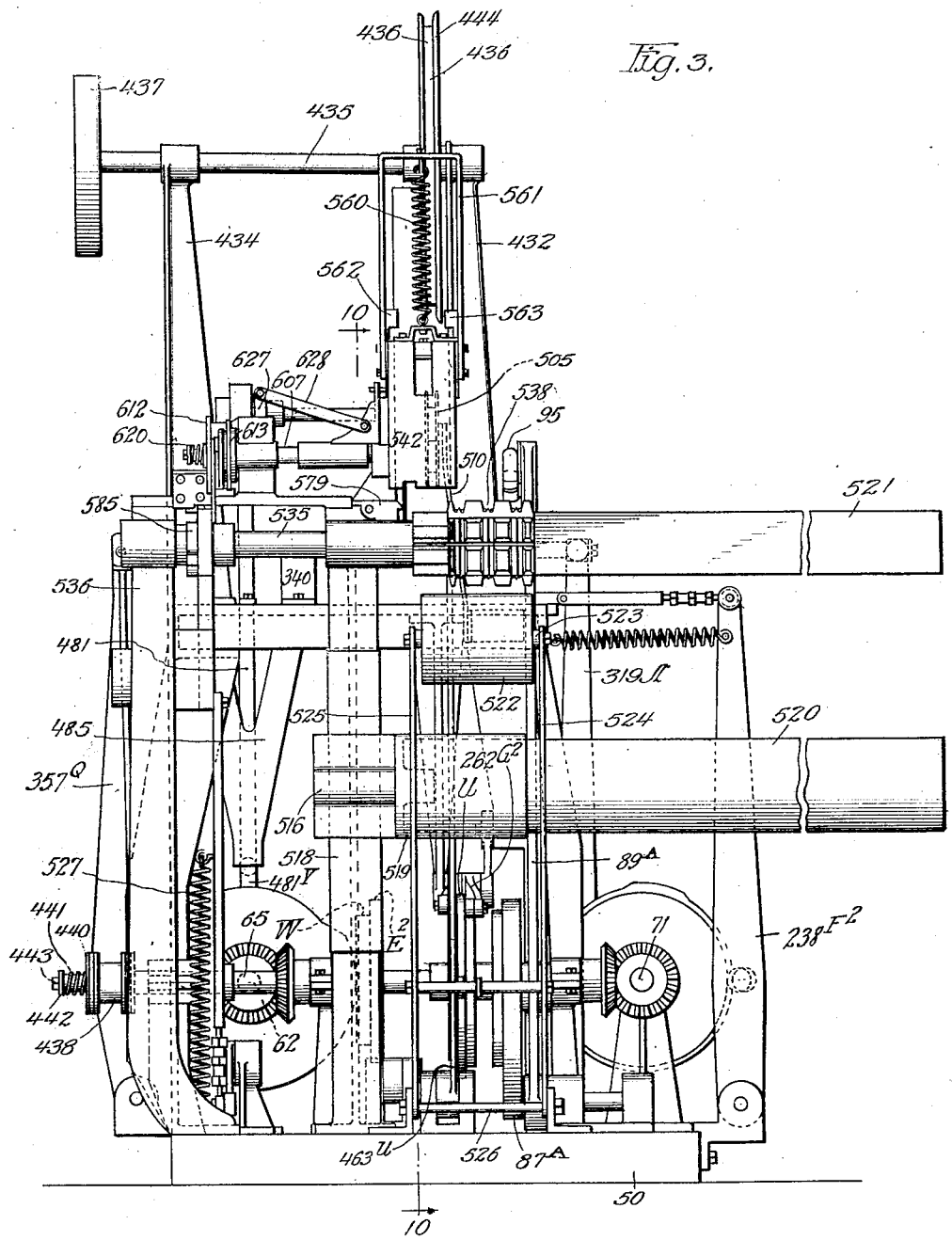
Fig. 3 is an end elevation of the machine shown in Fig. 1 and looking from the left hand side of the figure.
Figure 31:
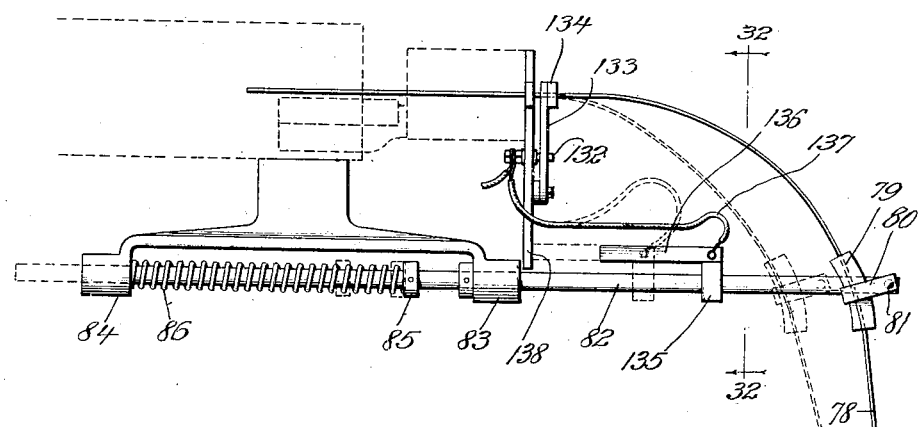
Figure 32:
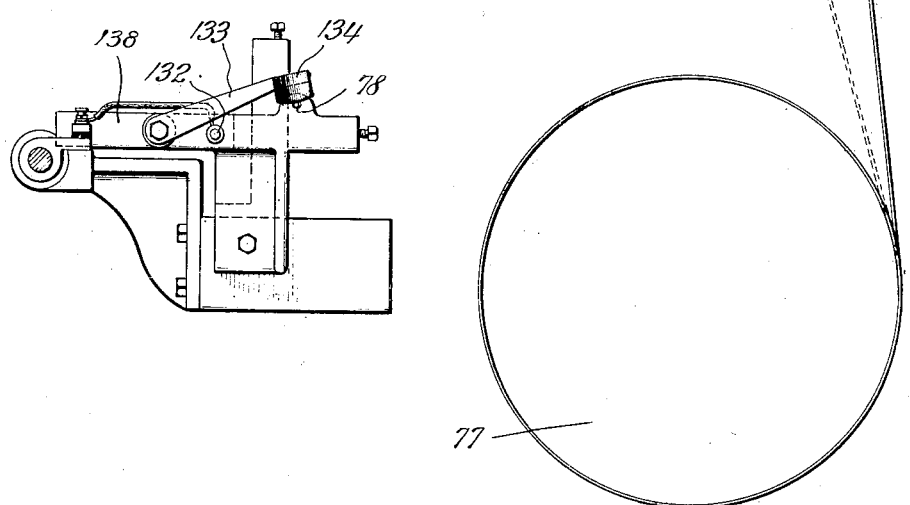
Figure 33:
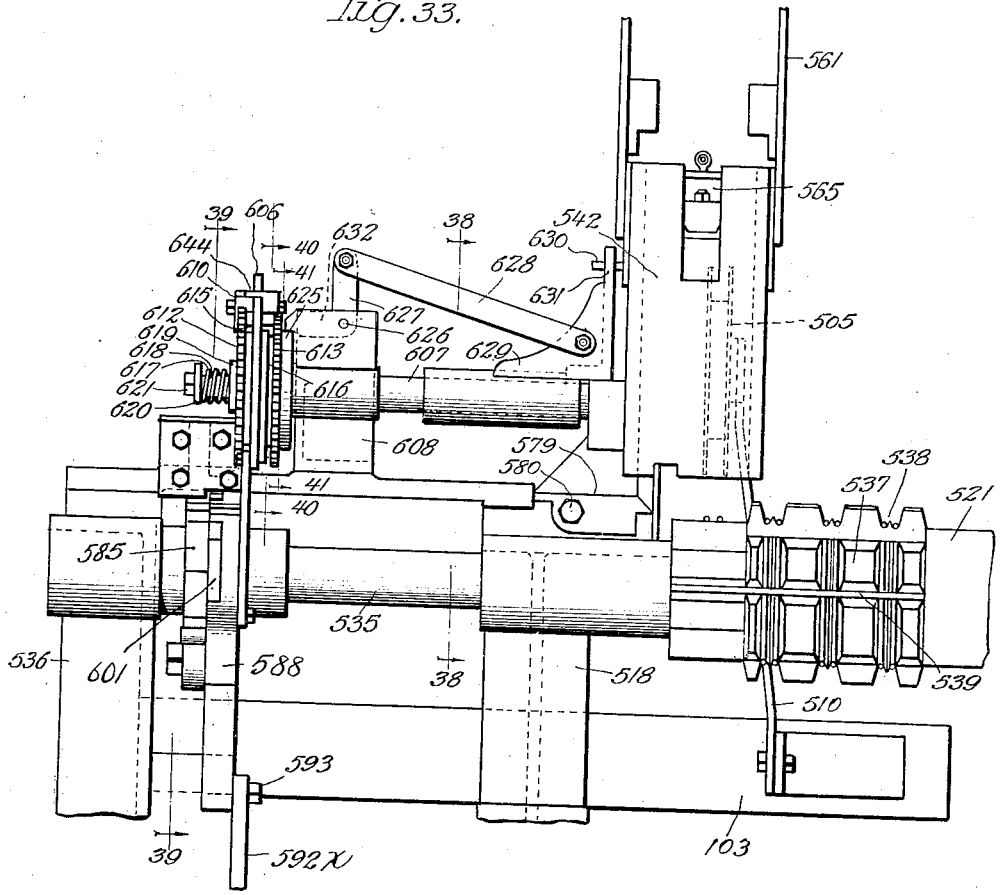
Figure 34:
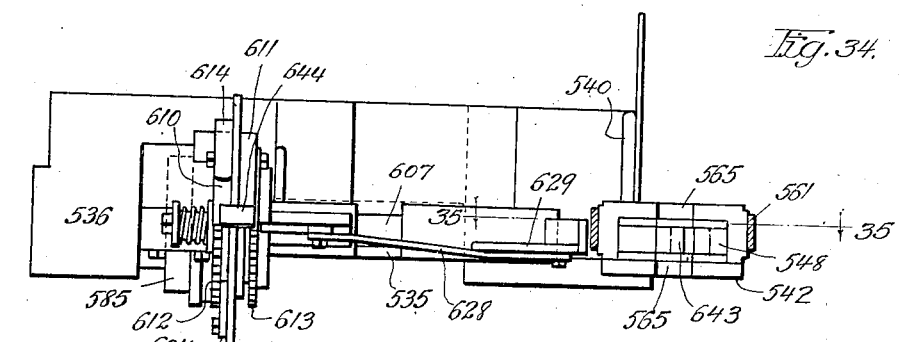

Figs. 25, 26, 27, and 28 are elevations of certain cams;

Fig. 29 is a plan view of the right hand end of the machine in Fig. 1, showing the wire-straightening and feeding mechanism;

Fig. 30 is a section taken on the line 30—30 of Fig. 29;

Fig. 31 is a plan view similar to Fig. 29, showing the wire reel and associated parts;

Fig. 32 is a section taken on the line 32—32 of Fig. 31;

Fig. 33 is an enlarged elevation, the same as, and showing a portion of, Fig. 3;

Fig. 34 is a plan view of the parts shown in Fig. 33;

Fig. 35 is a section taken on the line 35—35 of Fig. 34;

Fig. 36 is a section taken on the line 36—36 of Fig. 35;

Fig. 37 is a section taken on the line 37—37 of Fig. 35;

Fig. 38 is a section taken on the line 38—38 of Fig. 33;

Fig. 39 is a section taken on the line 39—39 of Fig. 33;

Fig. 40 is a section taken on the line 40—40 of Fig. 33;

Fig. 41 is a section taken on the line 41—41 of Fig. 33;

Fig. 42 is a perspective view of a portion of the Bronstien fabric heretofore referred to;

Fig. 43 is a perspective view showing the manner in which the continuous chain is joined to the end of the fabric;

Fig. 44 is a diagrammatic view showing the side of the fabric tube;

Fig. 45 is a detail showing the operation of the initial wire-clamping plunger; and Fig. 46 shows the various stages in the forming of the link.

In the following description, letters associated with various parts indicate that certain parts have certain functions; for instance, the letter A represents the feeding of the wire into the machine.

Referring to the drawings, the various parts of the machine are all carried by a cast iron base plate 50. Referring to Figs. 1, 2, 3, 4, and 5, 51 and 52 are a pair of pedestal bearings in which there is suitably mounted a main power shaft 53, to which is keyed a fast pulley 54, and which also carries a loose pulley 55. Said shaft 53 is revolved at suitable speed by means of a constantly running belt passing around the pulley 54, which belt may be shifted onto the loose pulley 55, when desired to stop the machine, by means of the fork 56, said fork 56 being carried on the end of a belt-shifting arm 57 pivoted in fixed bearings 58 and 59. Said belt-shifting arrangement may be operated automatically by mechanism which will be hereinafter described.

On the inner end of the shaft 53 there is keyed a pinion 60 which meshes with a large spur gear 61 keyed to the end of a cam shaft 62 rotatably supported in bearings 63 and 64. The other end of said shaft 62 drives a second cam shaft 65 through a pair of bevel gears 66 and 67, said cam shaft 65 being rotatably supported in a series of three pedestal bearings 68, 69, and 70. Said cam shaft 65 drives a third cam shaft 71 through a set of miter gears 72 and 73, said cam shaft 71 being rotatably supported in pedestal bearings 74, 75, and 76. The said cam shaft 62, 65, and 71 control and operate the various cam movements of the machine.

*The wire-feeding mechanism.*

In Fig. 31, 77 represents, somewhat diagrammatically, a spool of wire mounted to revolve on a vertical axis and arranged to feed the wire 78 through a curved section of tube 79 carried by a bail 80 pivotally supported at 81 on the end of a rod 82 arranged to slide in fixed guides 83 and 84. To said rod 82 is pinned an intermediate collar 85 which is engaged by a coiled compression spring 86 interposed between said collar 85 and the guide 84, so that the right hand end of said rod 82 is normally forced outwardly into the full line position shown in Fig. 31.

In Fig. 1, 87A represents a cam keyed to the second cam shaft 65 and provided with a closed cam groove 88 in which runs a roller carried by the wire-feed arm 89A, said arm 89A being pivotally mounted upon a fixed shaft 90 and being normally pulled toward the right hand end of the machine by means of a coiled tension spring 91 suitably secured to the fixed standard 92. It will be understood that as the cam 88 revolves, the upper end of the arm 89A will oscillate to and fro in the direction of the wire feed.

The upper end of said wire-feed arm 89A is slotted, as shown at 93, so that a pivot pin 94 may be adjusted along said slot at any desired distance from the axis of the pivot 90, such adjustment being for the purpose of lengthening or shortening the amount of wire fed at each stroke of said arm. Said pin 94 acts as a pivot for the round link 95, which is suitably bent to extend over other parts of the machine and is suitably secured in a small casting 96 which forms a bearing socket for a bar 97 (see Fig. 29). Said bar 97 is carried by and forms the end of a T-shaped double bell crank lever 98 mounted to oscillate upon a vertical pivot 99 carried by the slipper or cross-head 100, which is designed to slide upon a pair of fixed rods 101 and 102 carried by the top platform 103 of the machine. In the arm 104 of the said bell crank 98 there is mounted an adjustable stud 105, the end 106 of which is suitably beveled to engage the wire 78 and force the same tightly against an abutment 107 on the slipper 100. The opposite end 108 of the said bell crank 98 is equipped with another stud 109 forming a stop coöperating with the fixed set screw 110 to limit the reverse or rearward movement of the said bell crank 98.

Obviously, as the cam 87A is continuously revolved, the rod 95 will be reciprocated. When the parts are in the position shown in Figs. 1 and 29, the socket 96 is in its outermost position and the dog 106 is not forcibly engaging the wire 78; but as soon as the rod 95 commences to move inwardly, the bell crank 98 is rotated slightly and the dog 106 is moved forcibly against the wire, clamping the same against the slipper. As soon as the movement of the bell crank 98 relative to the slipper 100 has thus been arrested, the slipper 100 commences to move inwardly as the rod 95 continues to move, and a length of wire is fed into the machine. It is of course understood that the wire, before entering into the slipper 100, is straightened by means of sets 111 and 112 of straightening rolls of approved and customary design.

The automatic stop.

The machine embodies means for automatically arresting its operation when anything happens to the wire-feed or to the link-forming mechanism, thereby preventing damage to the operative parts of the machine. Such automatic means is electrical and is associated with the belt-shifting arm 57 heretofore referred to (see Fig. 5). The said belt-shifting arm 57 is mounted upon the rotatably mounted shaft 113, to one end of which, as shown in Fig. 1, there is keyed the lower end of the belt-shifting lever 114 which extends upwardly a sufficient distance to be conveniently operated by hand when it is desired to start the machine. Near the lower end of said lever 114 I connect the same by means of a coiled tension spring 115 to the outer fixed bracket 116, so that the said spring 115 normally tends to move the fork 56 into inoperative position, as shown in Fig. 5. Normally, when the machine is operating properly, the tendency of the spring 115 to move the lever 114 is resisted by means of a pair of toggle links 117 and 118 pivotally connected at their ends, the other ends of the said links 117 and 118 being respectively pivotally connected to the lever 114 and the fixed bracket 116. Obviously, so long as the two links 117 and 118 are alined, as shown in Fig. 1, they are operative to maintain the lever 114 in the position shown in Fig. 1. The said alined position of the links 117 and 118 is maintained by means of a transverse bar 119 (see Figs. 1, 4, and 5) which supports the pivotal connection 120 between the said links, and is itself supported on a small standard 121 by the base 50 of the machine (see Figs. 4 and 5). The said transverse supporting bar 119 is pivotally connected to the lower end of the plunger of a solenoid 122, and the weight of the same is normally supported by a strap iron stop member 123 bolted to the side of the bracket 116 (see Fig. 1).

In view of the above, it will be manifest that whenever the solenoid 122 is energized, the bar 119 will be lifted and will move the pivotal connection 120 out of alinement with the other pivots of the links 117 and 118, and the spring 115 will be permitted to pull the lever 114 into inoperative position. The circuit of the solenoid 122, which is normally deënergized, passes through a knife switch 124 which is automatically opened and closed by the movement of the lever 114, by means of a pair of pins 125 and 126 on the shift rod 127 pivotally connected at 128 to the lever 114.

Describing the manner in which the solenoid circuit is rendered operative to stop the machine, referring to Figs. 29 and 30, 129 is a fixed block of insulation on which is suitably secured a brass lug 130 so arranged in the circuit of the solenoid 122 that when a short circuit is made between the frame of the machine and the said insulated lug 130, the solenoid will be energized. In said lug 130 is bored a circular aperture 131, axially alined with the wire 78, so that, normally, when the wire 78 moves in a straight line, as it should do, into the machine, it will not engage the insulated lug 130. However, whenever the entrance of the wire into the machine is obstructed for any cause, the wire 78 will double up and engage the inner periphery of the aperture 131 in the lug 130, establishing a short circuit and causing stoppage of the machine.

I also arrange subsidiary mechanism for stopping the machine when the wire supply gives out. For instance, referring to Figs. 31 and 32, 132 is an insulated contact connected parallel with the insulated lug 130 and so placed as to lie in the downward path of movement of a pivoted lever 133, which, however, is normally raised out of engagement with the said insulated contact 132 by means of the presence of the wire 78 upon which the end 134 of said lever 133 normally rests. It will be manifest that absence of wire will cause the lever 133 to drop into engagement with the insulated contact 132, and thus automatically stop the machine.

I also arrange the connections and apparatus in such manner that snarling of the wire, or any obstruction preventing it from unreeling freely from the wire-supply reel 77, will also stop the machine. For instance, on the rod 82 I mount an insulated block 135, said block carrying a contact rod 136 also connected to and in parallel with the contact lug 130 and the contact pin 132 by means of a flexible conductor 137. It will be manifest that in the event of excessive tension on the wire, due to failure of the reel to deliver the same properly, or for any other cause, the plunger 82 will be forced inwardly into the dotted line position shown in Fig. 31 against the tension of the spring 86, and the contact rod 136 will engage the frame piece 138, thus causing the automatic stoppage of the machine.

*The link-forming mechanism.*

Figs. 11 and 12 show the relation of some of the principal mechanisms which operate upon the wire to form the link. As best shown in Fig. 12, the wire length is fed into a longitudinal aperture 139 eccentrically disposed in the plug or shaft 140 rotatably mounted in the platform or table 103. As the wire emerges from the inner end of said shaft 140, it passes across the cutting edge 141 of a knife member 142, through a groove 143 in the end of the arm 144, and through slots or other apertures in various members carried on the top of the said platform 103, also through the slot 145 in an arm 146 similar to the arm 144. As soon as the wire-feeding rod 95 and cross-head 96 has reached its limit of movement in the feeding direction, reverse movement of the wire being prevented by means of a check dog arrangement 147 (see Fig. 1), the free end of the wire is clamped by the following mechanism.

On the shaft 71 (see Fig. 7) which rotates in the direction of the arrow 148, is keyed a cam having a surface 149B, the cam part of which is concentric with the axis of the shaft 71, but which has a small incline 150B and a larger hump 151B. On said cam surface 149B runs a cam roller 152 on the end of a cam lever 153B pivotally mounted at 154, and having its rear end at 155 pivotally connected to a vertical push-rod 156B (see also Figs. 11, 12, and 45). When the cam 149B is in the position shown, with the roller 152 between the humps 151B and 150B, the push-rod 156B is in an intermediate position, permitting the wire to enter between the end 157 of the clamping plunger 158 and the fixed abutment 159 (see Fig. 45). However, when in said position, the wire 78 is retained and prevented from moving outwardly of the open slot 160 (see Figs. 12 and 13) by means of the end of the said plunger and the ends of certain pins 161 and 162 (see Figs. 12 and 13), and also as to its ends still further retained in said groove by the ends of the pairs of pins 163 and 164 (see Figs. 11 and 12). It will be understood that as the said cam 149B rotates, at the proper time the roller 152 will drop down the incline 150B, permitting the push-rod 156B to be pulled down by the spring 165B (see Fig. 7), thereby causing the incline 166 (see Fig. 45) to engage and clamp the wire against the abutment 159.

Figure 4:
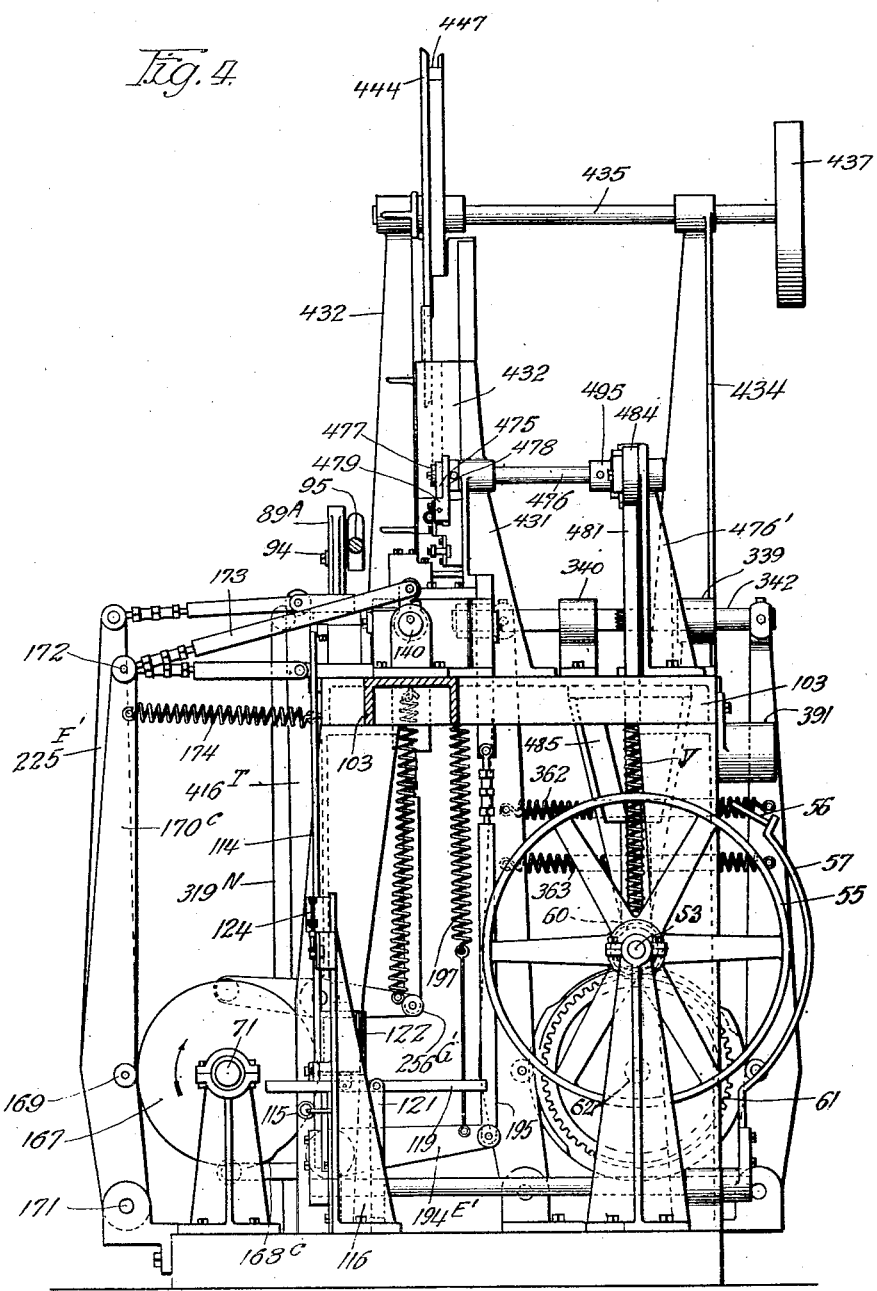
Fig. 4 is also an end elevation, but taken on the line 4—4 of Fig. 1, a portion of the apparatus being thus shown cut away.

After the wire has been clamped, it is cut off by the following mechanism. Referring to Fig. 4, on the shaft 71 there is keyed a cam 167 having a cam hump 168C which cooperates with a cam roller 169 carried by a cam lever 170C pivoted to the frame of the machine at 171 and having its upper end pivotally connected as at 172 to an adjustable connecting rod 173. The other end of said connecting rod 173 is pivotally connected to an arm keyed to the short shaft section 140, as shown more clearly in Fig. 12. It will be manifest that when the cam hump 168C strikes the cam roller 169, the lever 170C will be moved against the tension of the spring 174 (see Fig. 4) and will rotate slightly the short shaft section 140, causing the side of the wire to engage the edge 141 of the stationary knife 142 (see Fig. 12), thus severing the wire length from the end of the continuous wire supply fed through the aperture 139. It is of course understood that the inner end of the shaft 140 is suitably hardened to produce a proper shearing edge.

After the wire is severed, a preliminary bend is made intermediate its length, as shown at 175 in dotted lines in Fig. 21, and by the following mechanism. Referring to Figs. 6 and 12, on the shaft 71 there is keyed a cam having a cam surface 176D with which cooperates a cam roller 177 and a cam lever 178D having its lower end pivotally connected, as shown at 179, to the frame of the machine. The upper end of the said lever 178D is connected by means of an adjustable rod 180D to a slide 181 provided with an upper extension 182 (see also Fig. 12), in which slides a vertical plunger 183D. The lower end of the said plunger 183 at this time is held in the position shown in Fig. 12 by means of a spring 184 surrounding the reduced stem 185 at the upper end of the said plunger 183D and contained within a cylindrical cavity in the upper extension 182. By referring to Figs. 6, 12, and 21 it will be seen that when the cam roller 177 is struck by the incline 186 on the cam surface 176D, the upper end of the cam lever 178D will be moved outwardly, causing the lower end of the plunger 183D to engage and bend the wire, as shown in dotted lines in Fig. 21, the said wire being meanwhile supported by the abutment 159, constituting the rear end of the slot 160 on the one side, and on the other side being supported by the temporarily stationary bender 187, to be hereinafter referred to.

Figure 22:
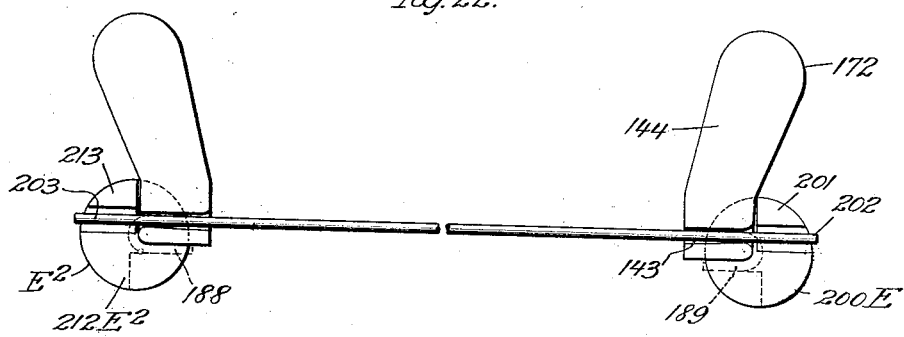
Fig. 22 is a view in elevation, taken from the rear of Fig. 12, showing the operation of the two mechanisms for forming hooks on the two ends of the wire unit.
Figure 26:
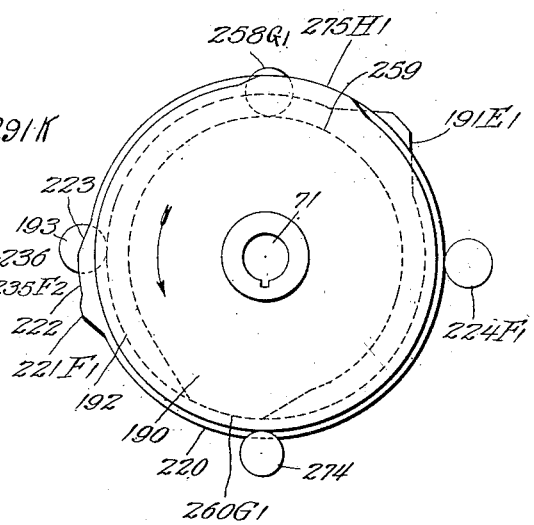

After the preliminary intermediate bend has been made in the wire length, the ends thereof are bent over at one hundred and eighty degrees (180°) to form short hooks, as indicated in dotted lines at 188 and 189 in Fig. 22, and by the following mechanism. As indicated in Figs. 5 and 26, there is keyed on the shaft 71 a cam 190 provided with a cam surface having a hump $191E^1$, the balance of the surface of said cam being concentric with the shaft 71, as indicated at 192. On said cam surface runs a cam roll 193 (see also Fig. 6) on the upper arm of a bell crank $194E^1$ mounted to rock on a stationary pivot, the horizontal arm of said bell crank being connected by means of a push-rod $195E^1$ to a rack $196E^1$. A spring 197 connected between the frame of the machine and the horizontal arm of said bell crank normally maintains the cam roll 193 in engagement with its cam. The sliding rack bar $196E^1$ (see also Fig. 19) slides in a vertical guide 198 and meshes with a pinion 199 keyed to the end of the rotatable shaft $200E^1$. As shown in Figs. 19 and 22, the other end of said shaft has a projection 201, which, as shown in Fig. 22, overhangs the end 202 of the wire supported in the groove 143. It will be manifest that when the cam hump $191E^1$ engages the cam roller 193 on the bell crank $194E^1$, the rod $195E^1$ will be pulled down and with it the rack bar $196E^1$, turning the pinion 199 and shaft $200E^1$, thereby causing the projection 201 to engage the end of the wire and bend the same into the dotted line position shown in Fig. 22.

Figure 27:
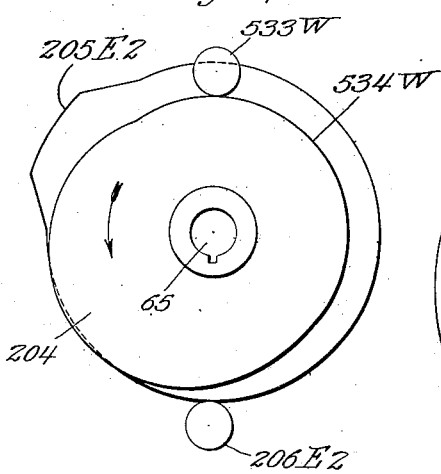
Figure 28:
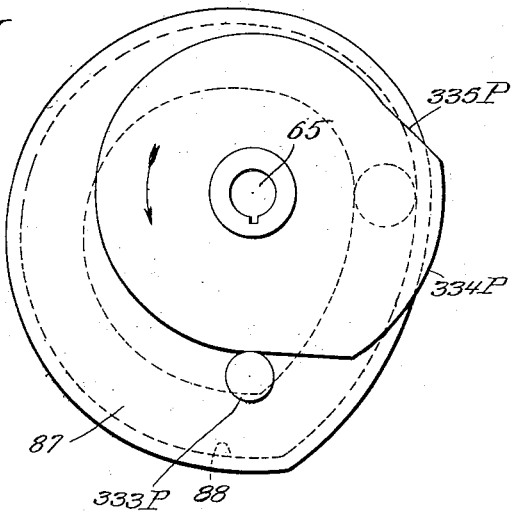

It will be understood that the other end 203 of the wire length is bent down in a similar manner, as shown at 188 in Fig. 22, and by the following mechanism. Referring to Figs. 5 and 27, on the shaft 65 is a cam 204 provided with a cam surface concentric with the shaft 65, except as to a hump $205E^2$. On said cam surface there rolls a cam roll $206E^2$ carried by a horizontal lever $207E^2$ and pivoted horizontally at its outer end, in a bracket 208 carried by the base 50 (see Fig. 5). To the inner end of said lever $207E^2$ there is pivotally connected an adjustable link 209 (see Fig. 10) pivoted to the lower end of the rack bar $210E^2$, similar to the rack bar $196E^2$, and engaging a similar pinion 211. It is understood that the pinion 211 is keyed to the shaft $212E^2$ (see Fig. 22), the latter having a bending projection 213 similar to the projection 201. It is manifest that when the cam hump $205E^2$ engages the cam roll $206E^2$, the pinion 211 will be rotated to bend the end 203, as shown in dotted lines at 188 in Fig. 22.

Associated with the means for bending the hooks 188 and 189, in the ends of the wire lengths, is mechanism for stretching the link while being bent, and releasing the same after the benders have completed their rotary movements. To this end, above the rotary bending shaft $200E^1$ (see Figs. 19, 20, and 22) I arrange a parallel rotatable shaft 214, one end of which carries a cam finger 215 engaging the shaft $200E^1$, the bevel surface 216 of said finger normally resting against a bevel surface 217 on said shaft. The other end of said shaft carries the arm 144 (see also Fig. 12) heretofore referred to. The arrangement is such that when the bender shaft $200E^1$ commences to rotate to bend down the end of the wire, the tip 216 of the cam arm 215 rides out of the notch 217 and thus causes the shaft 214 to rock slightly in such direction that the arm 144 is moved toward the end of the wire length. When the bender shaft $200E^1$ returns to its normal position, as shown in Fig. 20, by the raising of the cam hump $191E^1$ (see Fig. 26) losing engagement with the cam roller 193, the arm 144 obviously returns to its original position, thus releasing the tension upon the end of the wire length and permitting the end of the link to be moved out of the groove 143 by subsequently operating mechanism.

It should be understood that the companion bender shaft $212E^2$ controls a similar arm 146 by an arrangement which is a duplicate of the arrangement just described, and which therefore need not be further specified.

Figure 23:
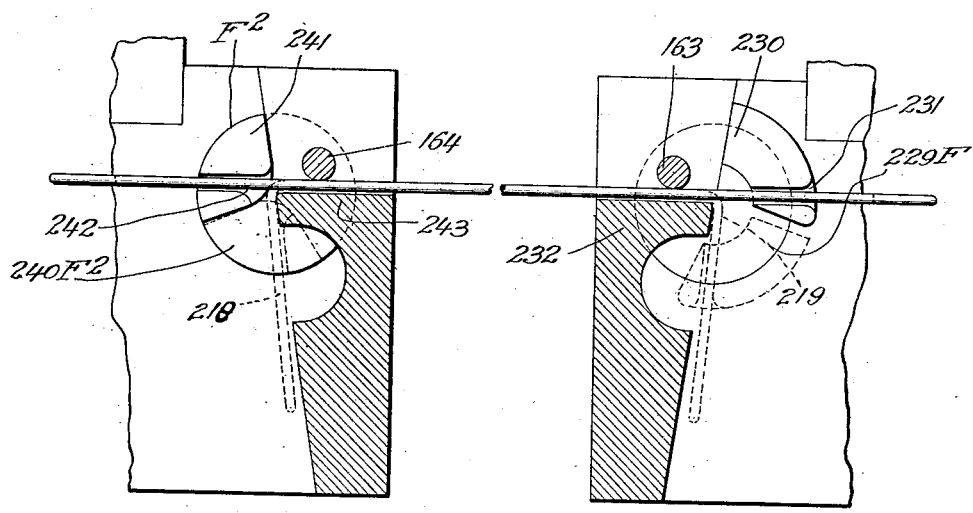
Fig. 23 is a sectional plan similar to Fig. 13, but showing the parts in another position.

After the ends of the wire length have been bent to form hooks, the right-angle bends 218 and 219 are formed therein by the following mechanism: On the shaft 71 (see Figs. 5 and 26) and formed as a part of the main cam casting 190, there is a cam surface, the major portion of which 220 is concentric with the shaft 71, but having a hump $221F^1$, a short intermediate raised portion 222, and a final incline 223. Said cam surface is engaged by a cam roller $224F^1$ on a vertical cam lever $225F^1$, the lower end of said lever being pivoted on a bracket projecting from the main base casting 50 (see also dotted lines, Fig. 6). Pivotally connected to the point 226 on the upper end of said cam lever $225F^1$ is a link pivoted to the inner end of a rack bar $227F^1$ which engages teeth 228 cut in the circumference of an axially vertical bender shaft $229F^1$. The bender shaft $229F^1$ is rotatably mounted in the frame of the machine, and at this time is raised to the height shown in Fig. 12 by mechanism to be described later. As shown in Fig. 23, said bender shaft $229F^1$ is provided at its upper end with a bending projection 230 which is grooved out, as shown at 231, in order to accommodate the wire. While the bending is taking place, one of the pins 163 holds the wire against the abutment 232 and thus prevents it from bowing under the action of the bender. It will be manifest that when the cam projections 221F¹ and 223 engage the cam roll 224F¹, the rack 227F¹ will be actuated to rotate the bending shaft 228 and cause the projection 230 to be moved down into the dotted line position, as shown in Fig. 23. By referring to said figure, it will be seen that the bender moves the end of the wire down into a position slightly sharper than that of a right angle, so as to allow for the resiliency of the wire.

The right angle bend in the other end of the wire link is effected by similar mechanism. On the shaft 71 is mounted a cam casting designated as a whole 233 having a cam surface 234 concentric with the shaft 71, with the exception of the hump 235F² and an intermediate raised portion 236, similar to 221F¹ and 222 on the cam 190. Said cam surface 234 accommodates a cam roller 237F², on a lever 238F², pivoted at its lower end, and its upper end connected to the rack bar 239, intended to actuate the rotary bending shaft 240F², similar to the rotary bending shaft 229F¹. The upper end of said bending shaft 240F² is provided with a projection 241 grooved as shown at 242 and which coöperates with the abutment 243 to bend the wire into dotted line position, as shown at the left of Fig. 23. Since the bending of the two ends of the wire link is substantially identical, it is unnecessary to go further into the detailed operation of the said bending shaft 240F².

Before proceeding further with the bending of the wire unit, the rotary benders 229F¹ and 240F² must be disengaged from the unit and depressed so that the tops of the parts 230 and 241 are below the level of the link. In order to release the wire so as to prevent friction of the bent ends on said bending shafts from distorting the link, the rotary benders 229F¹ and 240F² are partially rotated in reverse direction before they are completely returned to normal so as to take the spring out of the ends of the link. To this end, I provide the intermediate raised portions 222 and 236, which have been heretofore referred to. When the cam rolls rest upon said intermediate cam surfaces, the said bending shafts assume a position such that the bent ends of the link are held loosely in the grooves 231 and 242, thereby permitting free withdrawal in a downward direction of the said bending shafts 229F¹ and 240F². The withdrawal is effected as follows: The lower ends of the said bending shafts (see Fig. 12) are reduced in diameter to form stems 244 and 245 capable of rotating freely in the collars 246 and 247, said collars being prevented from dropping off the lower ends of said stems by means of washers 248 and 249 and nuts 250 and 251. Rotation of the collar 246 is prevented by an outstanding pin 252 which slides in a vertical slot 253 cut in the side of the fixed sleeve 254. Rotation of the collar 247 is prevented in a similar manner. The collar 246 is moved vertically by an adjustable rod 255G¹ the lower end of which is pivotally connected to the outer end of a horizontal cam lever 256G¹. Said lever 256G¹, as shown in Fig. 5, is pivoted as to an intermediate point in its length, upon a fixed shaft 257, and its outer end is equipped with a cam roll 258G¹ (see Fig. 26) which engages a surface 259 of the cam casting 190. A hump 260G¹ of some considerable length causes the depression of the push-rod 255G¹ in an obvious manner at the proper time in the cycle of movements, and thus lowers the bending shaft 229F¹ during a sufficient period to allow for subsequent operations to be performed.

In a similar manner the push rod 261G² is depressed by the inner end of a horizontal cam lever 262G² (see also Figs. 2 and 10) pivoted at 263 and carrying at its outer end a cam roll 264 which rides upon a cam surface 265 on the cam casting 266 and is actuated by a hump 267G² similar to the hump 260G¹ heretofore referred to.

At the same time, or shortly after, the benders 229F¹ and 240F² are lowered out of engagement with the link, certain stop pins, viz., the stop pins 163 and 164, are elevated in order to permit the link to be bent into the shape shown in Fig. 13. The two stop pins 163 are carried by a plate 268H¹, as shown in Fig. 12, the stop pins 164 being mounted in a similar plate 269H². The plate 268H¹ is carried on the upper end of a vertically slidable rod 270H¹, the lower end of which is pivotally connected at 271 (see Fig. 6) to the inner end of a horizontal lever 272 pivoted, as shown at 273, to the frame of the machine. The outer end of said cam lever 272 carries a cam roll 274 which is depressed by a raised circumferential cam surface 275H¹ of the rotary cam 190 keyed on the shaft 71 (see Fig. 26). It is manifest that when the raised portion 275H¹ strikes the cam roller 274, the plate 268H¹ carrying the pins 163 will be elevated, raising the lower ends of said pins out of the path of the wire.

Figure 25:
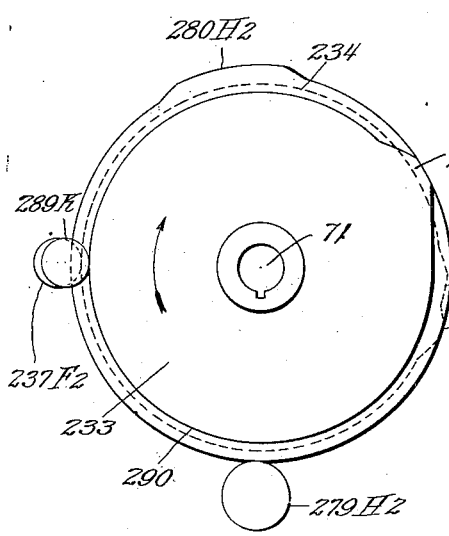

In a similar manner the plate 269H² carrying the pins 164, is elevated by the push-rod 276H² (see Fig. 10), which is connected to the inner end of a substantially horizontal cam lever 277H² (see Fig. 7) pivoted at 278 and equipped with a cam roller 279H² adapted to be engaged by a long hump 280H² of a cam surface on the main cam casting 233 (see Fig. 25).

Having removed the obstructions, as has been above described, we are now ready to effect the bending shown in Fig. 13. As shown in Figs. 11, 12, and 13, there is rotatably mounted in the frame casting 103 an axially vertical sleeve 281K having cut in its periphery gear teeth adapted to be engaged by the teeth of a rack bar 282. Within said hollow sleeve 281K there is contained a non-rotatable plug or shaft 283M, in the upper end of which there is eccentrically disposed a pin 284 around which one of the bends is performed. As shown in Figs. 12 and 13, the upper end of the sleeve 281K is milled off to form an upstanding projection 285 for doing the actual bending of the loop 286 when the sleeve 281K is rotated. The rack bar 282 is moved horizontally to rotate the bending sleeve 281K by means of a link 287 (see Fig. 7) pivotally connected to an upright cam lever 288K which carries a cam roll 289K (see Fig. 25) engaging a cam surface 290 on the cam casting 283. The cam hump 291K on said cam surface, the balance of which is concentric with the shaft 71, when it engages the cam roll 289K, obviously causes rotation of the sleeve 281K through the mechanism just described.

The eye 292 at the other end of the link is completed by a rotary former 293L mounted to rotate with its axis vertical, as shown best in Fig. 12. It will be remembered that the plunger 183D, carried by the upper slide 182, has been moved laterally into the position shown in Fig. 13 so as to make the initial or preliminary bend 175 (see also Fig. 21). When the rotary former 293L is rotated, the projection 187 sweeps through an angle of substantially one hundred and eighty degrees (180°), moving the arm 294 into the dotted line position shown at 295 in Fig. 13, thereby forming an eye around the stationary plunger 183D.

Rotation of the former 293L is effected by the following mechanism. Referring first to Fig. 12, 296L is a horizontal rack bar, the front end of which, as shown in Fig. 6, is pivotally connected to a short adjustable link 297 connected to the end of an upright cam lever 298L. The said cam lever 298L carries a cam roll 299L which is adapted to ride up and along a cam surface 300L coincident with the cam surface 176D; the cam lever 298L is rotatably mounted upon the common pivot 179 and is normally pulled toward the machine by means of a spring 301.

After the bends 286 and 292 have been completed, as shown in Fig. 13, the rotary bender 281K with its contained plunger 283M are withdrawn downwardly by the following mechanism. Referring to Fig. 12, it will be seen that the plunger 283M is enlarged, as shown at 302, to fit within a corresponding cylindrical recess in the top of the sleeve 281K, and on the bottom of the stem of said plunger 283M there is applied a collar 303 (see also Fig. 7) to which is secured a small strap member 304 pivotally connected at 305 to the top of a vertical link 306M. As shown in Fig. 10, the lower end of said link 306M is pivotally connected to one end of a horizontal cam lever 307M, pivoted on the common horizontal axis 263. The other end of said cam lever 307M carries a cam roll 308M which operates upon a cam surface 309M. It will be manifest that when the incline 310M engages the cam roll 308M, the link 306M will be pulled downwardly and cause the plunger 283M to descend and with it the rotary former 281K.

Figure 24:
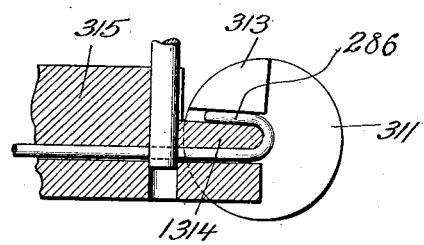
Fig. 24 is a section taken on the line 24—24 of Fig. 13.

As soon as the former 281K and plunger 283M have descended out of the way, the road is clear for the advancement of the transverse rotary former 311 which forms the bend 312, as shown in Fig. 24. Said rotary former 311 has its end milled off to produce a forming projection 313 which is moved into position ready for forming by the following mechanism. Referring to Figs. 7 and 13, it will be observed that the rotary former 311 is mounted to slide and to rotate in a cylindrical aperture 314 in a stationary part of the machine, the outer end of the said former 311 being equipped with a relatively rotatable but non-slidable collar 315 maintained in position on the reduced stem portion 316 of the said former 311 by a washer 317 and nut 318. The said collar 315 has a horizontal lateral extension which is loosely connected to the top of an upright cam lever 319N. It will be understood that outward movement of the upper end of the cam lever 319N will withdraw the plunger 311, while at the same time permitting it to rotate.

The lower end of the upright cam lever 319N is made in the form of a bell crank pivoted at 154, and having a short horizontally extending arm 320N equipped with a cam roller 321N operating upon a cam surface 322N. In the position shown in Fig. 7, the cam roll 321N is resting on the highest portion of the cam 322N, so that the former 311 is withdrawn in inoperative position. It will be understood that when the roll 321N drops off the high portion of the cam 322N and descends the incline 323, the spring 324N connected to the eye 325 on the said cam lever 319M will move the former 311 inwardly into such position that the projection 313 (see Fig. 24) will be located under the loop 286 in readiness for bending the same, as shown in said Fig. 24.

Describing the means for rotating the plunger or former 311 and referring to Fig. 13, 326P is a vertically slidable rack bar having teeth which engage corresponding teeth 327 in the former 311. As shown in Figs. 7 and 10, the lower end of the rack bar 326P is pivotally connected at 328 to the upper end of a vertical link 329P, the lower end of which is pivotally connected at 330 to one end of a horizontal cam lever 331P pivoted at 332. The other end of the said horizontal cam lever 331P carries a cam roll 333P which is actuated by the raised portion 334P (see also Fig. 28) of a cam keyed to the shaft 65. It will be obvious that when the incline 335P engages the cam roll 333P, the link 329P will be raised, moving the rack bar 326P (see Fig. 13) upwardly, thus rotating the forming projection 313. Said forming projection at that time being under the loop 286 will bend the same into the position shown in Fig. 24. When bending the said hook portion 312, the bender 313 coöperates with the horn 1314 extending horizontally across the link and forming a part of the plate 315 (see also Fig. 12).

*Link-twisting mechanism.*

Describing now the means for imparting the twist 336 to the twin lateral projections 337 and 338 (see Fig. 42), and referring particularly to Figs. 8, 9, 15, and 16, 339 and 340 are small brackets bolted to the top of a stationary rail or platform 341 extending across the machine behind the link-forming mechanism. Said brackets 339 and 340 are bored out to slidably and rotatably accommodate a shaft 342, the forward end 343 of which constitutes, in effect, a chuck. As shown best in Figs. 15 and 16, the chuck end 343 of said shaft 342 is milled out to provide a pair of vertically extending transverse grooves 344 and 345, meeting to form a slot-like aperture 346. The front or open end of said slot 364 is closed by a small plate 347 (see also Fig. 14) beveled out, as shown at 348, and perforated to admit the twin hooks 337 and 338 which, as shown in Fig. 16, also enter transversely the slot 346.

In order to hold the hook part 337 and 338 in relatively fixed position and to prevent distortion of the same while the twisting is being effected, I prefer to employ a locking finger or trigger 349 pivoted in the slot 346 on a transverse pin 350, and having a pointed tooth 351, which, upon suitable pivotal movement of said trigger 349, will be forced into the hooks shown in Fig. 16, keeping them spread apart during the twisting operation. Upon referring to Fig. 16, it will be observed that the tooth 351 is of small enough dimensions to enter the hooks, and also that the trigger 349 has at its end a subsidiary end tooth 352 which is spaced apart from the tooth 351 a sufficient distance to miss the bent over ends of the wire, and fits tightly against one side of the slot 346, forcing the wires against the other side of the said slot. The trigger or clamp 349 is operated by mechanism presently to be described.

On the rear end of the chuck shaft 342 is a collar 353 suitably arranged so that the end of the chuck shaft 342 can rotate therein but is incapable of sliding movement relative thereto. The said collar 353 is engaged by diametrically opposed studs 354 and 355 (see Fig. 2) secured in the arms of a fork 356 on the upper end of a vertical cam lever 357Q. Said cam lever 357Q is mounted at its lower end upon a fixed pivot 358 and at an intermediate point carries a cam roll 359Q operating upon the cam surface 360Q. When in the course of the rotation of the cam shaft 62, the cam roll 359Q drops down the incline 361Q, a pair of springs 362 and 363 connected between the said cam lever 357Q and another cam lever 364R cause the upper end of the said cam lever 357Q to move inwardly and push the chuck 343 over the pair of projecting hooks 337 and 338 (see Fig. 13 in dotted line, which shows the chuck 343 in the act of being moved to grasp the said hooks). When the hooks 337 and 338 have entered the slot 346 of the chuck 343 to the extent shown in Fig. 15, the trigger 349, which has up to this time been locked out of engagement by mechanism hereinafter to be described, is then engaged with said hooks by the following mechanism. Slidably mounted upon the outside of the chuck shaft 343 is a sleeve 365, the upper side of which is slotted, as at 366, to accommodate the tail 367 of the trigger 349 which projects out of the top of the slot 346. The length of the slot 366 is sufficient to permit a considerable amount of relative movement of the parts 367 and 365 before the ends of the slot engage said tail 367 when moving in either direction. As shown in Fig. 15, the rear end of the sleeve 365 is enlarged and grooved out to accommodate a swivel piece 368 carried between the arms of the fork 369, similar to the fork 356, and in the upper end of the vertical cam lever 364R, heretofore referred to (see also Fig. 8). The said cam lever 364R at its lower end is mounted upon a fixed pivot 370 and at an intermediate point is equipped with a cam roll 371R which is arranged to coöperate with the cam surface 372R on a cam keyed to the shaft 62.

Before the chuck shaft 342 has been moved to cause the entrance of the hooks 337 and 338, the cam roll 371R had been resting on the lowest point 372R of its cam and had therefore been maintained in its rearmost position by means of the springs 362 and 363, heretofore referred to. When in said rearmost position, the front end of the slot 366 was in engagement with the front face of the tail 367 (see Fig. 15), causing the trigger 349 to be rocked in an anti-clockwise direction so as to admit the hooks into the chuck. However, as soon as the chuck shaft 343 has moved forwardly to its limit of forward movement so as to engage the said hooks 337 and 338, the cam roll 371R rides up on the incline 373R (see Fig. 8), moving the sleeve 365 forward and causing the front end of said sleeve to engage the surface 374 of the trigger, locking the same into the position shown in Fig. 15. At the same time, the rear end of said slot 366 engages the back of the tail 367 and insures a positive clockwise rocking movement of the trigger 349, forcing the teeth 351 and 352 into engagement with the hooks, as shown in Figs. 15 and 16. Excess movement of the trigger 349 is prevented by an adjustable stop pin 375 inserted through the lower side of the sleeve 365, and engaging the under side of the said trigger.

Figure 2:
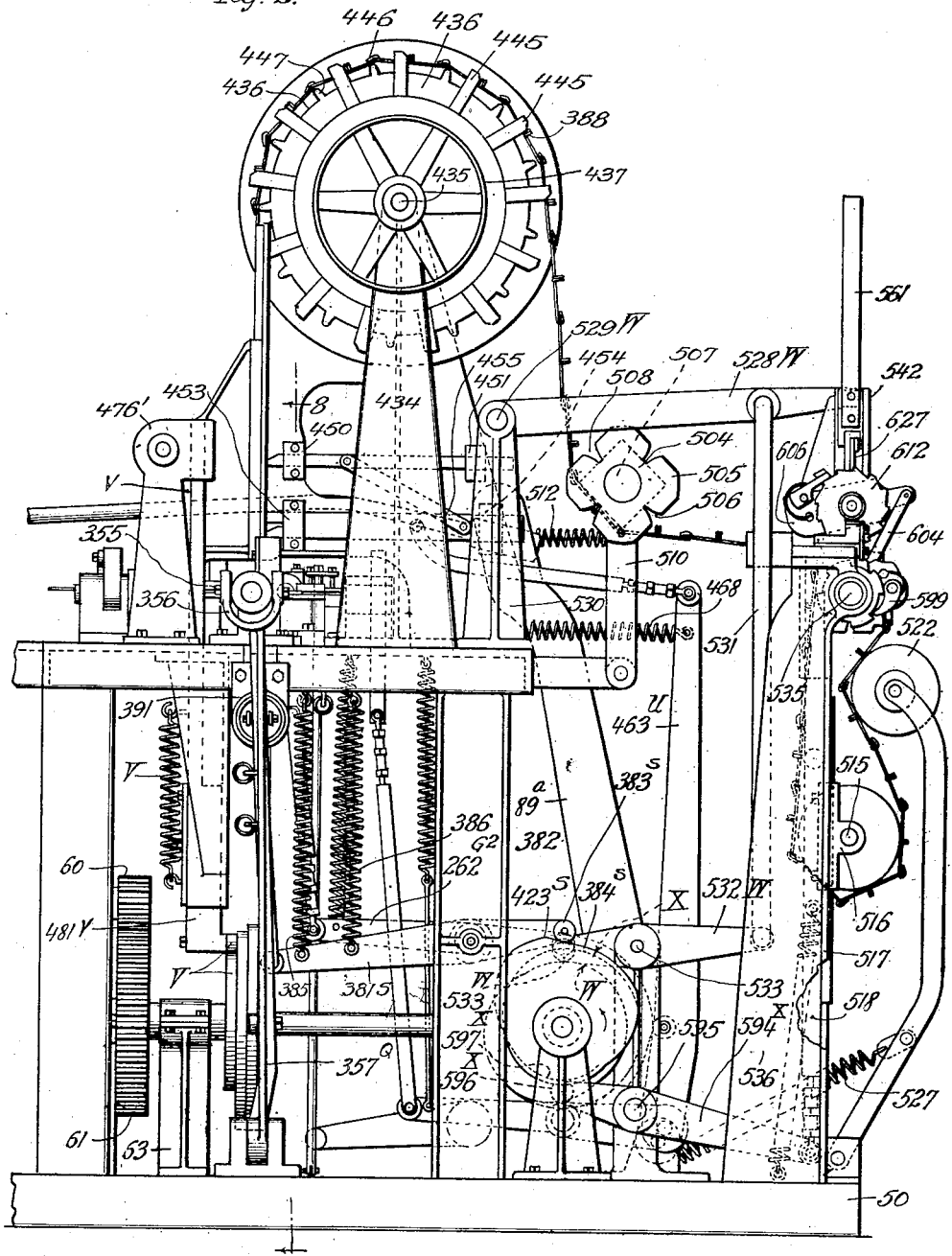
Fig. 2 is an enlarged rear side elevation of a portion of the machine shown in Fig. 1.

The actual twisting 336 can now be performed, it being understood that said twisting is effected while the link is still held in its original position in the link-forming mechanism and while the lateral projecting end of the link is firmly held by the trigger 349, as shown in Fig. 15, with the chuck shaft 343 fully advanced. It must, however, be understood, that in Fig. 15 the chuck shaft 343 is not shown in said last named fully advanced position. Referring to Fig. 8, it will be observed that a portion of the length of the shaft 342 is formed with teeth 376 which are engaged by teeth on a long rack bar 377S arranged to slide vertically in a fixed housing 378. The lower end of said rack bar 377S is pivotally connected at 379 to the upper end of an adjustable link 380S, the lower end of said link 380S being pivotally connected to the end of a horizontal cam lever 381S (see also Figs. 2 and 5). As shown in Fig. 2, said cam lever 381S is pivotally connected to the frame of the machine at 382 and at its other end is equipped with a cam roll 383S which rolls on a cam surface 384S. It will be readily understood that when the cam roll 383S descends an incline on its coöperating cam surface, the springs 385 and 386 will elevate the rack bar 377S (see Fig. 8) and cause the shaft 342 to rotate in the direction of the arrow 387. Similarly, when a projection of the said cam 384S strikes the cam roll 383S, the rack bar will be pulled downwardly to twist the chuck shaft 342 in a direction reverse to that of the arrow; that is to say, in a direction to impart to the cross member 388 (see Fig. 15) the twist 328 shown in said figure. The surface of the cam 384S is suitably shaped to impart a twist of one and one-half revolutions to the cross member 388 of the link when the chuck member 343 has been fully advanced to seize the link, so that the twisting hooks 337 and 338 have been reversed.

In order to lessen the jar and to avoid injury to certain parts, I prefer to cushion the movement of the cam lever 357Q (see Fig. 8) under the influence of the springs 362 and 363 by means of a dash pot 389 secured to the top frame of the machine by means of a small bracket 390. As shown in Figs. 8 and 9, said dash pot comprises a hollow cylinder 391 with a closed end 392 and having a projection 393 cast thereon. The end 392 is perforated, as shown at 394, to provide a small leak, and the boss or projection 393 has a row of apertures, as shown at 395, drilled through the same into the interior of the cylinder. The boss 393, as shown in Fig. 9, is also suitably drilled and tapped to accommodate a screw 396 which may be screwed in or out to adjust the leakage of the cylinder, it being understood of course that the row of holes is in alinement with the axis of the said screw. The piston 397 of the said dash pot cylinder has a wrist-pin 398 connected to the cam lever 357Q by a forked link 399 and a clevis bolt 400. In addition to the dash pot, a small helical spring 401 set into the outer edge of the top frame 341 (see Fig. 8) engages the upper end of the cam lever 357Q to cushion the movement of the same when it reaches the end of its stroke.

Having twisted the cross member of the link, we are now ready to remove the same from the link-forming mechanism and connect it to the end of the previously formed link chain. Before this occurs, the former 187 (see Fig. 13) must of course have been moved back toward normal position, in addition to which it is desirable to withdraw the part 314 (see Fig. 24) inwardly to minimize the friction when the link is removed. To this end, the slotted plate 315 and its companion plate 402 are divided or separated from each other, as shown at 403 (see Fig. 11), and the plate 315 in addition is pivoted on a vertical axis, as shown at 404.

Referring now to Figs. 11, 12, and 13, it will be seen that the push-rod 156B is milled off, as shown at 405 to form an incline 406 which, upon descent of the plunger 156B, as heretofore described, has engaged the edge 407 (see Fig. 11) of the plate 315 and has forced the same outwardly away from the plate 402. When, however, the cam roll 152 (see Fig. 7) engages the hump 151B, the cam lever 153 will raise the push-rod 156B, causing the bevel 406 (see Fig. 12) to rise above the edge 407 (see Fig. 11), permitting the spring 408, which is seated in a recess 409 of the plate 315, to push the said plate inwardly and relieve the end thrust on the pin 183D and the horn 314 (see Fig. 24).

At the same time that the end thrust on the link is relieved, the clamping plunger 158, which is connected to the top of the push-rod 156B by means of a cover plate 410, is raised, together with the positioning pins 161 and 162, also secured at their upper ends in said plate 410 (see Fig. 12).

At the same time that the plunger 158 and pins 161 and 162 are raised vertically, the plunger 183D (see Fig. 13) is also raised out of the link by the forming mechanism. Referring to Fig. 12, it will be observed that the lower end of said plunger 183D is slotted, as shown at 411, through which slot passes the rectangular end 412T of a slide-bar 413T (see Fig. 6). Said bar 413T is beveled, as shown at 414, so that when said bar 413T is pushed inwardly, the beveled surface 414 will engage the top of the slot 411 and raise said plunger 183D. Said push-rod 413T is pushed forward by a link 415 connected to the upper end of a vertical cam lever 416T, having its lower end pivoted to the frame of the machine at 417. At an intermediate point, said lever 416T carries a cam roll 418T which operates upon a cam surface 419T. The arrangement is such that when the small hump 420T on said cam 419T engages the cam roll 418T, the upper end of the said lever 416T will be moved inwardly against the resistance of the compression spring 421 and will move the slide bar 413T inwardly a sufficient distance to raise the plunger 183D out of the link. After the link has been thus released by the link-forming devices and while the cross member 388 (see Fig. 15) is still grasped by the chuck 342, it is drawn back by a rearward movement of the shaft 342 a sufficient distance to bring it in alinement with the chain, in the position shown in Fig. 15. Said rearward movement of the shaft 342 is effected by the cam incline 422Q (see Fig. 8) after which the shaft 342 remains axially stationary a sufficient length of time to permit the link to be connected to the end of the chain. Such connecting of the link is effected by an approximately ninety-degree (90°) reverse twist imparted to the shaft 342 by a suitable incline 423S (see Fig. 2) which, when the cam roll 383S drops down said incline, permits the springs 385 and 386 to raise the rack bar 377S.

As shown in Figs. 14 and 15, the link 424 has been rotated through nearly ninety degrees (90°) to permit the hook 425 to enter the eye 426 in the end of the last link 427 of the previously formed chain. The chain is then moved upwardly a short distance so as to lock the hook end 425 securely into the eye, as shown at 428, by mechanism to be presently described, whereupon the link is released from the chuck as follows.

After the link 424 has been engaged with the chain, the sleeve 365 is moved rearwardly by reason of the cam incline 373R (see Fig. 8) coöperating with the cam roll 371R, and the front end of the slot 366 in said sleeve engages the front of the tail 367 of the trigger 349, thus causing the teeth 351 and 352 to be moved upwardly to disengage the hook part 388 of the link. This enables the chuck shaft 342 to be withdrawn a sufficient distance to completely disengage the link 424 and permit upward movement of the chain, of which the said link has become a part. Said rearward movement of the chuck shaft 342 is effected by a cam incline 429Q coöperating with the cam roll 359Q.

*The chain feeding and clenching mechanism.*

Figure 17:
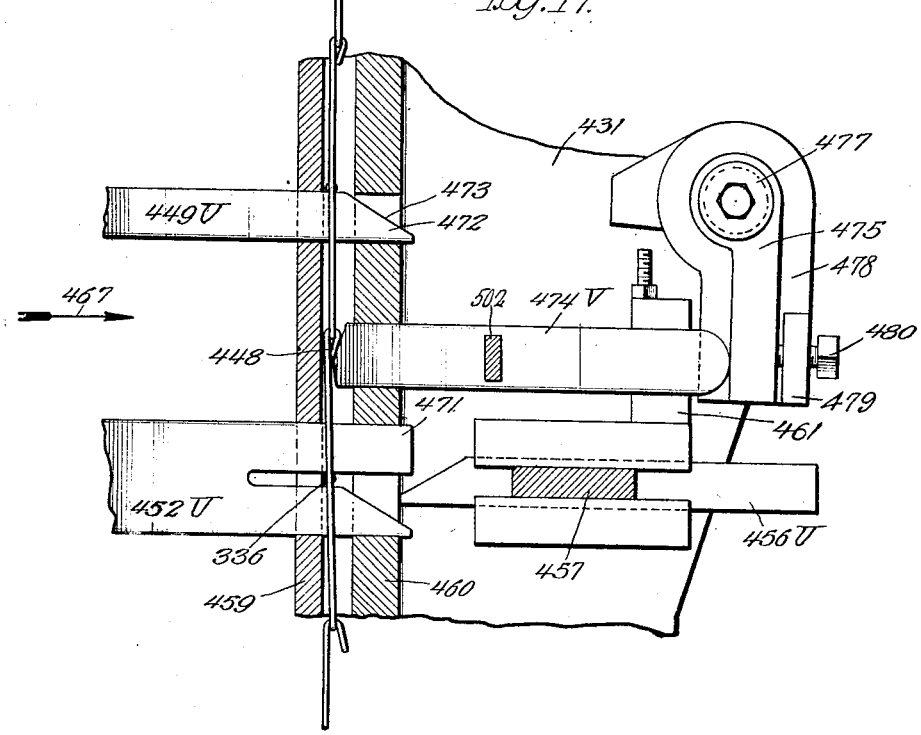
Fig. 17 is a section taken on the line 17—17 of Fig. 15.
Figure 18:
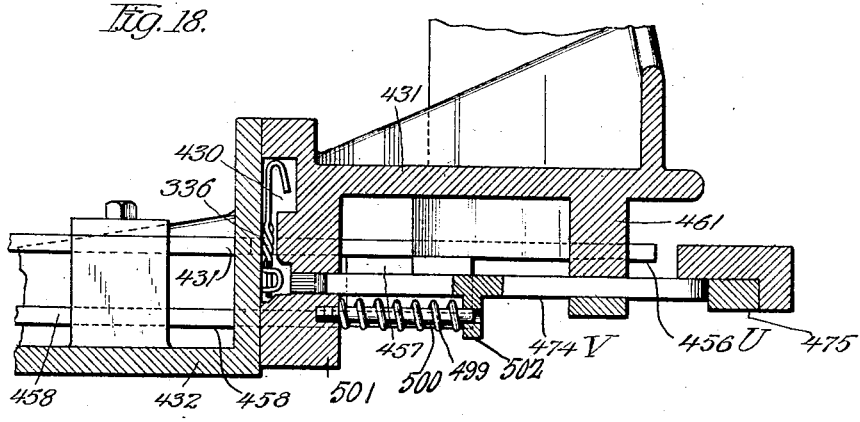
Fig. 18 is a section taken on the line 18—18 of Fig. 14.

As best shown in Figs. 15, 17, and 18, the chain is fed vertically upward through a closed vertical conduit 430 formed in the vertical bracket 431 and the vertical bracket 432 suitably bolted thereto, as shown at 433 in Fig. 14, said brackets being suitably supported on the top platform 103 of the machine, as shown in Fig. 1. Rotatably supported in the top of the bracket 432 and a companion bracket 434 (see Fig. 3) are a shaft 435 to which is keyed pulleys 436 and 437. The pulley 437 is driven by a belt connecting it with a shrouded pulley 438 which is capable of rotary movement upon the shaft 65, but exerts considerable tension on the said belt, by reason of a friction arrangement comprising an inner disk 439 keyed to the said shaft 65, an outer disk 440 slidable along said shaft 65, and a coil compression spring 441 which normally exerts considerable inward pressure upon the slidable disk 440, and thereby causes the pulley 438 to be frictionally driven, but at a less speed than the shaft 65. The spring 441 is prevented from flying off the end of the shaft 65 by a washer 442 and cap screw 443 screwed into the end of said shaft. As shown best in Figs. 2 and 3, said pulley 436 is equipped with a continuous flange 444 on one side, and on the other side with a series of flat arms 445 spaced apart to correspond with the spacing of the chain links and arranged to engage behind the cross members 388, as shown in Fig. 2. The distance between the arms 445 and the flange 444 is sufficient to accommodate the longitudinal portion of the chain which, at the junctions 446, is supported by the small radial projections 447 in the groove of said pulley 436. It will be understood that there is not exerted upon the chain a sudden pull, due to the frictional drive just described.

Describing the means for regulating said feed and clenching the hooks of the links, as shown at 448 in Fig. 17, 449U is a horizontal bar standing on edge and adapted to slide in suitable guides 450 and 451 on the bracket 432 (see Fig. 2). Connected to move in unison with the said bar 449U is a lower bar 452U also suitably supported to slide in guides 453 and 454, said bars 449U and 452U being connected together by means of a diagonal link 455. A third bar 456U opposing the bar 452U is connected to said bar 452U by means of a lateral lug 457 and a link 458 which is secured to a similar lug (not shown) on the face of the bar 452U. The abutting faces 459 and 460 of the brackets 432 and 431, in which the conduit 430 is formed, are slotted to accommodate the said bars 449U, 452U, and 456U in a line in the path of the twisted portions 336 of the chain links (see Fig. 18), the bar 456U being also suitably supported in an integral guide 461 on the face of the bracket casting 431.

Said feed bars just described are moved back and forward by a link 462U (see Figs. 10 and 2) pivotally connected at its inner end to the feed bar 452U, and at its outer end to the upper end of a cam lever 463U. Said cam lever 463U has its lower end mounted on a stationary pivot 464 and carries a cam roll 465U operating upon its proper cam. It will be understood that when the cam roll 465U drops down the incline 466U, the feed bars will move in the direction of the arrow 467, shown in Fig. 17, by means of a spring 468. Also, it will be obvious that when the cam roll 465U rides up on the incline 469U, the system of feed bars will be moved in the reverse direction.

In the position of the parts shown in Figs. 10, 14, and 15, the cam roll 465U has been elevated and the feed bar 465U has been moved into such position that the point 470 is above and is engaged by the top of the twisted part 336 of the link 427, the chain of course being stretched taut by the frictional drive heretofore described. When the roll 465 drops down the incline 466U (see Fig. 10), the feed bar 456U is drawn rearwardly, permitting the part 336 of the link to rise into engagement with the under side of the top half 471 of the bar 452U, as shown in Fig. 17. At the same time, the point 472 of the bar 449U has entered below the cross member of the link next above the upper link, and, by reason of the beveled edge 473, has taken up any possible slack in the connection between the hook 448 and the eye of the said upper link.

With the lower section of the chain held in the position just described, by the feed bars 449U and 452U, the hook 448 is ready to be clenched, as shown in Fig. 17. Said clenching is effected by the beveled end of a plunger 474V actuated by an oscillatory arm 475 loosely mounted on the shaft 476 journaled in a bracket 476' and a boss on the bracket 431. Said arm 475, as shown in Fig. 4, is interposed between a fixed end washer 477 and an arm 478 keyed to the said shaft 476. The arm 478 has a laterally projecting lug 479 through which passes an adjustable set screw 480, whereby the stroke of the plunger 474V may be adjusted. The shaft 476 is rotated by mechanism now to be described.

Referring to Fig. 14, 481V is a rack bar vertically slidable in a housing 482 and meshing with a series of teeth 483 forming part of a mutilated gear integral with the oscillatory arm 484, loosely mounted on the said shaft 476. Said rack bar 481V has its lower end (see Fig. 8) slidably carried in a V-shaped bracket 485 depending from the under side of the top frame 341. The lower end of the said rack bar 481V carries a cam roller 486V which cooperates with a cam 487V keyed to the shaft 62. It is manifest that when the shaft 62 is rotated, the cam member 488V will engage the cam roll 486V and raise the rack bar 481V to rotate the arm 484 in the direction of the arrow 489.

On the arm 484 I mount on a horizontal pivot 490 a pawl 491 normally pressed by the plate spring 492 into the notches of a ratchet wheel 493. The ratchet disk 493 is loosely mounted on a shaft 476 between the arm 484 and a disk 494, said disk being provided with an integral hub 495 (see Fig. 4) keyed to the shaft 476. Backward rotation of the ratchet disk 493 is prevented by a check dog 496 mounted to rock upon a stationary pivot 497 fixed in the top of the bracket 476¹. At a certain point in the circumference of the keyed disk 494, the edge thereof is notched out to form a single tooth 498. The disk 494 is keyed to the said shaft 476 in such position that during the rocking movement of the arm 484 in the direction of the arrow 489, the point of the pawl 491, which is wider than the thickness of the ratchet disk 493, will engage the tooth 498 over which it extends and rock the shaft 476 slightly. Such rocking movement of the shaft 476 will obviously drive the plunger 474V inwardly and clench the hook 448, as shown in Fig. 17. Referring to Fig. 14, it will be observed that the clenching plunger 474V is returned to its normal position by a spring 499 surrounding a fixed pin 500 and interposed between the stationary boss 501 on the bracket 431 and a laterally projecting lug 502 formed as a part of the clenching plunger 474V, perforated to slidably receive the end of the said fixed pin 500.

Still referring to Fig. 14, it will be seen that the ratchet wheel 493 has one of its notches 503 of considerably less depth than the remaining notches in the disk. Obviously, when the ratchet disk 493 has been stepped around by the pawl 491, a tooth at a time, into such position that the end of the pawl 491 engages in said shallow notch 503, the point of said pawl will be farther from the axis of the shaft 476 than when it rested in one of the regular deep notches of the ratchet disk. When the pawl 491 is thus engaged in the abnormal shallow notch 503, it sweeps by the point of the tooth 498 on the keyed disk 494 without engaging the same, and the plunger 474V is therefore not operated. Of course upon the next oscillatory movement of the arm 484, the dog 491 falls into one of the deep notches of the ratchet disk 493 and actuates the clencher plunger 474V as before. The effect of said shallow notch in the ratchet disk 483 is manifestly to cause a failure to clench the hook 448 for each number of links of the chain that there are teeth in the ratchet disk 493, assuming that the arm 484 is oscillated sufficiently to advance the ratchet disk one tooth per cycle of the machine.

After the chain leaves the reel 436, it passes below a four-winged pulley 504 having spaced apart side plates 505 and 506 and a square center 507 of sufficient dimensions to accommodate one link of the chain per side of the square. It is understood that the side plate 506 has each of its four edges notched in, as shown at 508, to accommodate the cross members of the chain links. The said pulley 507, which revolves idly upon a pin 509 (see Fig. 1), besides changing the direction of travel of the chain, also maintains the same tightly stretched. To this end, the pivot 509 carrying the said pulley 504, is mounted in the upper end of an upstanding arm pivoted at its lower end to a bracket 511 projecting from the upper platform 103. A spring 512, connected between a hook 513 in the bracket 432 and a pin 514 in the arm 510, maintains an even tension on the chain.

*The fabric assembling mechanism.*

The fabric is assembled from the preformed chain in a somewhat similar manner to that described in United States patent to John F. Gail No. 967,011, dated August 9, 1910; that is to say, it is constructed helically in the form of a tube of indefinite length (see Fig. 43, which illustrates slightly more than a single coil of the fabric tube). The cross members 388 serve to connect together the adjacent spirals of chain which constitute the completed fabric tube.

Referring to Fig. 2, 515 is a short shaft mounted in a small bracket 516 slidably adjustable upon a pair of guides 517 formed as integral parts of the standard 518 carried by the main base 50. The object of said adjustability of the slide 516 is to accommodate fabric tubes designed for beds of different lengths. Said shaft 516 forms a pivot for a drum shaft casting 519 (see Fig. 3), inside of which fits a light tubular structure 520 extending a considerable distance out from the machine, as shown, and underlying the horizontal fabric drum 521. The drum 520 rotates idly upon the said stationary pivot 515, and the fabric is maintained in engagement therewith by means of a short sheet metal idler drum 522 (see Figs. 1, 2, and 3), loosely mounted upon a shaft 523 carried at the ends of a pair of upstanding arms 524 and 525 pivoted at their lower ends on a stationary cross shaft 526 mounted in brackets carried by the main base 50. A spring 527 (see Figs. 1 and 2) pulls the idler drum 522 tightly against the side of the fabric tube, as shown in Fig. 2.

Describing first the actuating mechanism for the plunger arm 528W, as shown in Fig. 2, it will be observed that the inner end of said arm is pivotally connected on a horizontal axis 529W at the upper end of the bracket 530 carried by the top platform 103 of the machine. At an intermediate point, said arm 528W is connected by a link 531 with the outer end of a cam lever 532W mounted on a stationary pivot 533. The other end of said arm 532W carries a cam roll 533W (see also Fig. 27) which rolls upon the cam surface 534W of a cam keyed to the shaft 65. It will be obvious that as said cam rotates, the outer end of the arm 528W will be oscillated in a vertical plane.

The fabric drum 521 is keyed to a shaft 535 rotatably supported in the standards 536 and 518 (see Fig. 3). Referring now to Figs. 33 to 39, it will be observed that the drum 521, just inside of the bracket 518, is formed with a square-sided driving portion 537 having circumferential grooves 538 and longitudinal grooves 539. The said driving portion of the drum is of course of suitable dimensions and design to receive the chain, it being understood that the shaft 535 (see Fig. 36) is intermittently driven in clockwise direction by mechanism hereinafter to be described. 540 represents a bracket bolted to the top of the standard 518 and having a vertical pocket or rectangular groove 541 closed by a vertical cover plate 542 (see Fig. 37). Within said pocket or groove 541, the clenching mechanism is adapted to reciprocate. Said clenching mechanism also includes devices for effecting a lateral shift of each link of the chain just after it enters the assembling drum zone so as to hook one side limb 543 of each link over the hook part 544 of the link in the adjacent spiral of the last completed fabric portion, as shown in Fig. 35.

Within the vertical slot 541 is adapted to slide a vertically reciprocable built-up slide composed of side plates 545 and 546 (see Figs. 35 and 36) which are connected as at 547 to the fillers 548 and 549. Said slide is normally pulled vertically upward by means of a substantial tension spring 560 connected to a stationary U-shaped standard 561 (see Fig. 3) bolted to the sides of the bracket 540. A pair of stops 562 and 563 limit the upward movement of the said slide, which is connected with the spring 560 by a U-shaped strap 564 (see Fig. 35) bridging and bolted to the parts 549 and 548. As shown in Fig. 35, the end of the arm 528W enters rectangular notches 565 in the upper ends of the said plates 545 and 546.

Under ordinary circumstances, the end of the arm 528W rests upon the top edge 566 of a bell crank lever 567 mounted between the plates 545 and 546 on a horizontal pivot 568, said bell crank being normally forced into the position shown in Fig. 35 by a coil spring 569 set into the lower end of the part 549. On the lower part of the filler 548 and at the sides thereof there is located a pair of swinging latching plates 570 and 571 mounted to swing on a horizontal pin 572. At their lower ends, each of said plates has a pair of forks 573 and 574 which, in the normal position, shown in Fig. 35, upon depression, are adapted to receive the part 543 of the link. The plates 570 and 571 are moved in the direction of the arrow 575 in order to drop the part 543 behind the hook 544 by the following mechanism. When the slide is moved downwardly in its guides by the descent of the arm 528W the block 576, carried between and riveted to the plates 570 and 571, is so arranged that its beveled end 577 engages the beveled end 578 of an arm 579 mounted to swing on a horizontal pivot 580 fixed in the bracket 540. The arm 579, being unable to move downwardly or endwise, causes the latching plates to swing on the pivot 572 and move in the direction of the arrow 575 as the clenching slide descends. Thus, the limb 543 of the link is moved beyond the point of the hook 543. After the plunger has descended a certain distance and after said latching plates have moved the part 543 behind the point of the hook 544, the slide has descended a sufficient distance to allow the point 578 of the arm 579 to snap into the slot 581 in the part 576, thereby permitting the latching plates to rock back into their original position, shown in Fig. 35, under the influence of a compression spring 581'. It will be understood, however, that as they rock back, the limb 543 is moved under the hook 544, the latter being thus ready for clenching. Such clenching of the hook 544 is effected by a tool steel block 582 secured to the bottom of the part 548 by rivets 583. During the clenching operation the lower ends of the plates 570 and 571 enter the slots 1583 in the drum 521 (see Fig. 36).

By referring to Fig. 36, it will be observed that the lower end of said clencher 582 is forked, as shown at 584, so as to correct any possible spreading of the twin parts of the hook 544. It will be understood that when the bell crank 567 is in the position shown, the arm 528W will move the clenching slide far enough to properly clench the point of the hook 544. After the clenching has been performed, and upon return of the clenching slide by the spring 560, when the arm 528W rises, the arm 579 rocks on its pivot 580 until the point 577 has risen a sufficient distance to permit the said arm 579 to drop back into the position shown in Fig. 35.

Describing now the means for rotating the assembling drum 521, and referring particularly to Fig. 39,—on the end of the shaft 535 (see also Fig. 33) there is keyed what is in effect a ratchet wheel 585 with a series of four notches 586 forming teeth 587. Loosely mounted on the said shaft 535 is an arm 588, a portion of which constitutes a mutilated gear with teeth 589 engaging the teeth of a rack bar 590X. The rack bar 590X is reciprocated in a guide 591 by means of a link 592X pivotally connected at 593 to the rack bar 590X, and at its lower end connected to the outer end of a cam lever 594X (see Fig. 2). Said cam lever 594X is mounted to rock upon a stationary pivot 595, and on its inner end carries a cam roll 596X operating upon a cam 597X. It will be understood that as the cam 597X rotates, the rack bar 590X is moved vertically, thus oscillating the arm 588. The arm 588 carries a pivot 598 on which rocks a pawl 599 normally pressed into engagement with the teeth 587 by a plate spring 600. In the position shown in Fig. 39, the rack bar 590X has been elevated to its highest point and the drum shaft 535 has just been moved one tooth. When the rack bar 590X again descends, the arm 588 is moved a sufficient distance to cause the pawl 599 to drop behind the next tooth of the ratchet wheel 585, and, during said reverse movement, the cam plate 601, secured to the said arm 588, engages the beveled lower end of the stop plunger 602, causing the latter to slide upwardly in its guide-housing 603, thus permitting the ratchet wheel 585 to be moved by the pawl 599, when the rack bar 590X again rises and actuates the arm 588 in reverse direction.

I will now describe mechanism which is employed in order to facilitate the separation of the otherwise continuous tubular bed fabric into sections corresponding to single bed lengths. Such disconnection is facilitated by omitting certain clenching operations in substantially the same manner as described in the Gail patent heretofore referred to. That is to say, I periodically omit one longitudinal clenching operation of the part 474V at intervals in the chain corresponding in length with the length of a spiral, thus forming a longitudinally extending unclenched seam in the tubular fabric portion; in addition to which, after a given interval representing a certain number of completed spirals, the clenching of the lateral connections on the drum 521 is omitted during a complete revolution of the tubular fabric, thus facilitating the disconnection of the individual bed lengths. The unclenched longitudinal seam in the fabric of course enables the operator to unhook each spiral of a bed length section of the tubular fabric at the same point so that the tube can be opened out and made flat.

I have already described the mechanism for causing the production of the unclenched longitudinal seam, such mechanism including the shallow notch 503 of the ratchet wheel shown in Fig. 14. I will now describe the means for causing the production of an unclenched circumferential seam.

Referring to Fig. 39, 604 represents a link pivotally connecting the arm 588 with the tail 605 of an arm 606 mounted to oscillate upon a shaft 607 carried in a small bracket 608 (see Fig. 33) bridging the tops of the two standards 518 and 536. The opposite end of said arm 606 has a pivot stud 609 carrying a pair of pawls 610 and 611, said pawls being forced toward the teeth of spaced apart ratchet wheels 612 and 613 by means of plate springs 614.

Improper movements of the ratchet wheels 612 and 613 are prevented by means of a pair of leather disks 615 and 616 interposed between said ratchet wheels 612 and 613. The arm 606 which is interposed between the ratchet disks 612 and 613 is prevented from frictionally moving the same by reason of the fact that it is loosely mounted to rock upon a sleeve or bushing which is slidably keyed to the shaft 607. Said keying of the said bushing (not shown) obviously prevents the movement of one ratchet wheel from being communicated improperly to the other ratchet wheel. Said leather disks 615 and 616 are rendered effective by a coil spring 617 surrounding the reduced end 618 of the shaft 607 and interposed between a sliding collar 619 engaging one of the ratchet wheels and a fixed collar 620 which is prevented from flying off the outer end of the shaft 607 by means of a nut 621. As shown in Figs. 39 and 40, the outer ratchet wheel 612 has an abnormally deep notch 622 considerably deeper than the other notches in the circumference of said ratchet wheel 612. Also the ratchet wheel 615 is provided as to its exposed side with a pair of pins 623 which drive a disk 624 provided with a circumferential beveled projection 625, the arrangement being such that the disk 624 partakes of the rotary movement of the ratchet wheel 613.

Referring now to Figs. 33, 35 and 41, it will be seen that in the top of the casting 608 there is a slot through which extends a transverse pin forming a pivot mounting for the flat bell crank lever 627. To the upper arm of said bell crank lever 627 there is pivotally connected an oblique link 628, the rear end of which is also pivotally connected to a slide casting slidably mounted upon the fixed shaft 607. Said slide casting 629 is prevented from rotating upon the stationary shaft 607 by means of a guide pin 630 parallel with the shaft 607 and fixed in the side of the casting 540 and slidably entering the upper extension 631 of the said slide 629. The outer end of the horizontal arm 632 of the said bell crank 627 extends over the edge of the rotatable disk 624 and is beveled as shown in Fig. 41 at 633 in order to have cam-like engagement with a corresponding incline on the projection 625 of said disk 624. It will be manifest that when the control disk 624 is moved into such position that the said beveled surfaces co-act to raise the end of the horizontal arm 632 of the bell crank 627 thereby causing the end of the said arm to ride upon the outer concentric surface 634 of the said projection 625, the link 628 will be pushed rearwardly thus moving the slide casting 629 toward the bracket housing 540. Now referring more particularly to Fig. 35, it will be observed that in the filler member 549 there is a cut-away opening 635 through which passes a fixed pin 636 forming a pivot upon which rocks in a vertical plane the depending T-shaped arm 637. One of the limbs 638 of said T-shaped arm 637 extends through an opening in the side of the casting 540 a sufficient distance to be engaged by the vertical face 639 of the slide casting 629. The other arm 640 of the said T-shaped arm 637 is beveled as shown at 641 in order to coöperate cam fashion with a corresponding bevel on the horizontal arm 642 of the bell crank 567 heretofore referred to. It will be manifest that when the slide 629 is moved toward the casting 540 in the manner previously described the bell crank 567 will rock on its pivot 568 into such position that the upper edge 566 will be moved from under the end of the arm 528W and said arm 528W if then actuated to depress the clenching head will engage the lower offset surface 643. The difference in the heights of the surfaces 566 and 643 will thus represent the difference of the stroke of the clenching head in the two different positions of the bell crank 567. Obviously, when the bell crank 567 is moved into position so that the surface 566 is no longer engaged by the end of the arm 528W the clenching block 582 will not descend a sufficient distance to bend over the hooks 544 (see Fig. 35).

Describing now the manner in which the disk 624 is actuated to control the clenching of the transverse fabric connections just referred to, it will be understood that upon each oscillatory movement of the fabric drum actuating arm 588, the link 604 will cause a similar oscillatory movement of the ratchet wheel control arm 606. Such movement of the arm 606 will in an obvious manner cause a step by step movement of the ratchet wheel 612 through the pawl 610. Each to and fro movement of the pawl 610 causes the ratchet wheel 612 to move one tooth, and during the ordinary regular movements when the pawl 610 engages in the shallow notches of said ratchet wheel 612, the pawl 611 which coöperates with the other ratchet wheel 613 will be raised out of engagement with the notches in said ratchet wheel 613 by reason of an integral transverse projection 644 on the end of the pawl 611 which extends over the pawl 610. Said pawl 611 is thus normally raised out of engagement with the ratchet disk 613. When, however, in the course of the rotation of the ratchet wheel 612 the end of the pawl 610 drops into the deep notch 622, the end of the pawl 611 will be permitted to engage the notches in the ratchet wheel 613, thus moving the same when the arm 606 is again actuated. Ratchet disk 613 will thus make a single rotary movement of one, two or three notches, depending upon its number of teeth, during the whole revolution of the ratchet wheel 612. Under ordinary circumstances and by reason of the fact that the control disk 624 has but a single actuating projection 625 the said ratchet disk 613 must make a complete revolution before it is effective to prevent clenching of the transverse fabric connections, in the manner previously described. It will be understood, however, that when the said control disk 624 has been moved into its effective position for the said purpose, it will remain in such position during a complete revolution of the main ratchet wheel 612, thus causing failure of the clenching mechanism to operate during a complete revolution of the fabric on its axis, it being understood of course that the ratchet wheel 612 has the same number of teeth as there are links in a complete spiral of the fabric tube.

It will be understood that I have described only a single application of my invention which may be embodied in widely differing forms for different specific purposes to suit individual requirements. Hence, the scope of the invention is not limited by the specific described details of construction or operations, but must be determined by reference to the appended claims.

I claim:

1. In wire working mechanism, the combination of means for moving a wire member into position to be operated upon, forming means, including a pin and a rotary element for doubling said wire member upon itself and around said pin, means for withdrawing said forming means axially after its forming operation, a second rotary former disposed at an angle to the first former, and means for advancing said second former axially toward the doubled end subsequent to said withdrawal of the first former, for effecting a second bend in said wire member common to the limbs of said doubled end.

2. In wire working mechanism, the combination of a support for a wire member, a rotary member axially slidable in said support and provided with a pin having a fixed axis and a part rotatable around said pin for forming said wire unit into a loop around said pin, means for withdrawing said axially slidable part subsequent to a forming operation, a second axially slidable part arranged with its axis substantially at right angles with the axis of the first member and including a part for effecting a second loop bend in the loop end of said wire member, and means for axially advancing and retracting the second axially slidable member in the proper timed relation with respect to the operation of the first member.

3. In wire working mechanism, the combination of means for positioning a length of wire to be formed, a plunger transversely disposed with reference to said wire length, means for moving said plunger sidewise against said wire length, and means for subsequently withdrawing said plunger axially out of engagement with said wire.

4. In wire-working mechanism, the combination of a support for a wire length which is to be formed, a plunger having its axis disposed transversely to said wire member, means for moving said plunger sidewise against the wire member, means for axially moving said plunger, and a rotary former for bending a portion of said wire member around said plunger.

5. In wire-working mechanism, the combination of a support for a wire length which is to be formed, a plunger having its axis disposed transversely to said wire member, means for moving said plunger sidewise against the wire member, means for axially moving said plunger, and a rotary former for bending a portion of said wire member around said plunger, said rotary former having its axis substantially parallel with the axis of the plunger.

6. In link-forming mechanism, the combination of means for forming a wire unit with a pair of projecting limbs, a chuck-supporting member, means slidably and rotatably supporting said member, a chuck on one end of said member, a cam, mechanism controlled by said cam for effecting suitably timed axial movements of said member, a second cam, mechanism controlled thereby for causing said chuck to grip said limbs and hold said unit, a third cam, and connections controlled by said cam for effecting rotary movements of said chuck by rotating said member, said chuck-controlled mechanism including means permitting a retractive movement of said member while said unit is held by said chuck.

7. In link-forming mechanism, the combination of means for forming a wire unit with a pair of projecting limbs, a chuck-supporting member, means slidably and rotatably supporting said member, a chuck on one end of said member, a cam, mechanism controlled by said cam for effecting suitably timed axial movements of said member, a second cam, mechanism controlled thereby for causing said chuck to grip said limbs hold said unit, a third cam, and connections controlled by said cam for effecting rotary movements of said chuck by rotating said member, said chuck-controlled mechanism including means permitting a retractive movement of said member while said unit is held by said chuck, the third cam being suitably constructed and timed with reference to the chuck-control and axial movement control to effect a rotary movement of said chuck subsequent to a retractive movement of said member.

8. In wire-forming mechanism of the class described, the combination of a support, a chuck-supporting member slidably and rotatably supported in said support, a chuck dog pivoted on a transverse axis in the end of said chuck-supporting member and provided with an arm projecting out of said chuck-supporting member, and a member slidably mounted on said chuck-supporting member and adapted to engage said arm for effecting rotary movement of said dog.

9. In wire-forming mechanism of the class described, the combination of a support, a chuck-supporting member slidably and rotatably supported in said support, a chuck dog pivoted on a transverse axis in the end of said chuck-supporting member and provided with an arm projecting out of said chuck-supporting member, and a sleeve member slidably mounted on said chuck-supporting member and longitudinally slotted to receive the end of said arm, the ends of said slot constituting means for effecting rotary movements of said chuck dog in opposite directions.

10. The combination of means for forming a length of wire into a link provided with integral twin lateral projecting limbs, chuck mechanism for engaging the projecting ends of said limbs, means for effecting axial movement of said chuck to engage the same with the unit and for subsequently effecting axial movement of said chuck with the unit engaged therein to remove the completed unit out of the field of the link-forming mechanism, and twister mechanism for rotating said chuck to twist said limbs together, the arrangement including means for finally disconnecting the chuck from the completed unit.

11. In a machine of the class described, the combination of chain-feeding mechanism, link-forming mechanism and twisting mechanism having the dual function of twisting the link and connecting the same to the chain.

12. In a machine of the class described, the combination of mechanism for forming a link with a pair of twin lateral projecting limbs, twisting mechanism for twisting together said limbs, and means for effecting bodily movement of said twisted link, the arrangement including means for subsequently connecting said unit to the end of a previously completed chain.

13. In a machine of the class described, the combination of mechanism for forming a link having an eye at one end and a hook at the other end, and a means for gripping said link and effecting a transverse bodily movement thereof out of the field of the link-forming mechanism, the arrangement including means for subsequently connecting said link to the end of a previously formed link.

14. In a machine of the class described, the combination of mechanism for forming a link having a pair of limbs lying in substantially the same plane, and means for effecting a transverse movement of said link in a line lying in the limb plane and out of the field of the link-forming mechanism, the arrangement including means for subsequently connecting said link to the end of a previously formed link.

15. In a machine of the class described, the combination of means for forming a link having a pair of limbs lying substantially in the same plane and being provided with an eye at one end and a hook at the other end, means for gripping said link and effecting a transverse bodily movement thereof, out of the field of the link-forming mechanism, in the plane of the said link limbs, and means for subsequently connecting said link to the end of a previously formed link.

16. In a machine of the class described, the combination of mechanism for forming a link with a hook at one end and an eye at the other end, and mechanism for effecting transverse bodily movement of said link from out of the field of the link forming mechanism, the arrangement including means for subsequently rotating said link about an axis transverse to said link to connect said link into a hook and eye engagement with the end of a previously completed length of chain.

17. The same as claim 16, with the addition of mechanism for moving said chain longitudinally step by step as links are connected thereto.

18. The same as claim 16, with the addition of clenching mechanism for closing the hook of said unit subsequent to its connection with said chain.

19. Chain feeding mechanism comprising means for continuously exerting tension on said chain, a pair of opposed stop members adapted alternately to engage the chain to resist its movement, and mechanism for automatically moving said top members in unison to render same alternately effective to arrest such movement.

20. In chain feeding mechanism, the combination of a guide way for the chain length, means for pulling one end of said chain length, a pair of opposed stop members disposed on opposite sides of said guide way, and means for moving said stop members in unison transversely of said guide way to and fro to alternately engage and arrest the movement of said chain.

21. The same as claim 20, with the addition of mechanism for operating upon said chain in between the alternate movements of said stop members.

22. The same as claim 20, with the addition of automatically operating mechanism for adding links to the end of said chain during a period of rest of movement of said chain by one of said stop members.

23. In a fabric-making machine, the combination of means for forming successively and singly wire units provided with integral longitudinal and lateral interengaging parts for direct connection longitudinally and laterally with similar adjacent units, means for interengaging and connecting the units longitudinally, and mechanism for subsequently interengaging and connecting the units laterally.

24. In a machine for making fabric composed wholly of parallel chains of longitudinally-interhooked integral wire units provided with integral lateral parts transversely and directly interhooked with units of adjacent chains, the combination of means for forming said units singly, means for interhooking the ends of said units singly and successively with the end of a previously connected chain of units, and mechanism for subsequently interengaging the lateral interhooking parts of the units in one chain singly and successively with an adjacent chain of an adjacent previously completed fabric portion.

25. In a machine for laterally connecting together a pair of chains each composed of a series of connected units provided with lateral interengaging parts adapted to engage parts on the units of the adjacent chain, the combination of means for feeding one of said chains of previously connected units into position adjacent to the other chain, and mechanism for successively shifting said units singly, laterally, a sufficient distance to engage the adjacent chain.

26. In a machine for laterally connecting together a pair of chains each composed of a series of connected units provided with lateral interengaging parts adapted to engage parts on the units of the adjacent chain, the combination of means for feeding one of said chains of previously connected units into position adjacent to the other chain, mechanism for successively shifting said units, singly, laterally, a sufficient distance to engage the adjacent chain, and subsequently returning said units into their original relative positions.

27. In a machine of the class described, the combination of a support for a length of fabric composed of longitudinal units having integral lateral inter-hooked connections, with mechanism for feeding units longitudinally into position parallel with units already connected to said fabric portion, and mechanism for subsequently effecting relative latching movement of said inter-fitting lateral connections to connect said units singly and successively and laterally to said fabric portion.

28. The same as claim 27, with the addition of clenching mechanism for permanently effecting said lateral connection.

29. In a machine of the class described, the combination of a rotary fabric assembling drum for effecting step-by-step spiral movements of a length of previously completed fabric composed of laterally connected spirally arranged chains of longitudinally interhooked wire units provided with integral laterally inter-hooking parts, with means for positioning one of said unit chains parallel with the terminal chain of said fabric portion, latching mechanism for inter-hooking said lateral connection between the units of said first chain and said terminal chain, and mechanism for subsequently clenching said lateral connection to permanently unite said unit to said fabric.

30. The same as claim 29, with the addition of means automatically operating to prevent clenching of a series of fabric units successively fed to said fabric.

31. The combination of means for intermittently advancing and spirally disposing a continuous chain formed of inter-hooked wire units with integral transverse connecting parts, and means for connecting adjacent convolutions of the chain between the intermittent advance movements thereof by inter-hooking said transverse connecting parts.

32. The same as claim 31, with the addition of means for clenching said inter-engaging parts to unite permanently said adjacent convolutions.

MADISON C. JUDSON.